(12) United States Patent
Takagi et al.

(10) Patent No.: US 12,344,737 B2
(45) Date of Patent: Jul. 1, 2025

(54) THERMOPLASTIC ELASTOMER FOAM PARTICLES AND MOLDED BODY OF SAME

(71) Applicant: JSP Corporation, Tokyo (JP)

(72) Inventors: Shota Takagi, Fuji (JP); Akinobu Hira, Yokkaichi (JP)

(73) Assignee: JSP Corporation, Tokyo (JP)

( * ) Notice: Subject to any disclaimer, the term of this patent is extended or adjusted under 35 U.S.C. 154(b) by 847 days.

(21) Appl. No.: 17/610,659

(22) PCT Filed: Apr. 23, 2020

(86) PCT No.: PCT/JP2020/017430
§ 371 (c)(1),
(2) Date: Nov. 11, 2021

(87) PCT Pub. No.: WO2020/235290
PCT Pub. Date: Nov. 26, 2020

(65) Prior Publication Data
US 2022/0235216 A1 Jul. 28, 2022

(30) Foreign Application Priority Data
May 17, 2019 (JP) .................................. 2019-093829

(51) Int. Cl.
B32B 3/20 (2006.01)
B32B 27/28 (2006.01)
B32B 27/32 (2006.01)
C08L 53/00 (2006.01)

(52) U.S. Cl.
CPC .................................. *C08L 53/00* (2013.01)

(58) Field of Classification Search
None
See application file for complete search history.

(56) References Cited

U.S. PATENT DOCUMENTS

| 2012/0100376 A1 | 4/2012 | Sakaguchi et al. |
| 2014/0097389 A1 | 4/2014 | Chiba et al. |
| 2018/0072861 A1* | 3/2018 | Martin ............... C08G 18/3206 |
| 2019/0256680 A1* | 8/2019 | Takagi ..................... C08J 9/228 |

FOREIGN PATENT DOCUMENTS

| JP | 2012-126816 A | 7/2012 | |
| JP | 2014-77045 A | 5/2014 | |
| JP | 2018-080226 A | 5/2018 | |
| JP | 2018-080227 A | 5/2018 | |
| TW | 201114816 A1 | 5/2011 | |
| WO | WO-2018088390 A1 * | 5/2018 | ............ C08J 9/0028 |

OTHER PUBLICATIONS

International Search Report for PCT/JP2020/017430, mailed Jul. 28, 2020, and English Translation submitted herewith (5 pages).
JPO; Application No. 2019-093829; Office Action dated Mar. 28, 2023 and English translation submitted herewith, 5 pages.
TIPO; Application No. 109113712; Office Action dated Jun. 9, 2023 and English translation submitted herewith, 25 pages.

* cited by examiner

*Primary Examiner* — Michael J Feely
(74) *Attorney, Agent, or Firm* — Fitch, Even, Tabin & Flannery LLP

(57) ABSTRACT

The present invention relates to cylindrical expanded thermoplastic elastomer beads provided with through-holes, the expanded thermoplastic elastomer beads including a core layer in an foamed state constituted of a base polymer containing a thermoplastic elastomer and a cover layer covering the core layer and constituted of a thermoplastic polymer, wherein a coefficient of dynamic friction of the thermoplastic polymer is 0.8 or less, and a difference between a melting point (Tmc) of the base polymer and a melting point (Tms) of the thermoplastic polymer is −20° C. or more and 20° C. or less. The present invention also relates to an expanded thermoplastic elastomer beads molded article formed by subjecting expanded thermoplastic elastomer beads provided with through-holes to in-mold molding, the molded article including a core layer in a foamed state and a cover layer covering the core layer, wherein a voidage is 15% or more, a density is 10 kg/m³ or more and 200 kg/m³ or less, and the product of a tensile strength (MPa) and a tensile elongation (%) is 5 or more.

12 Claims, No Drawings

THERMOPLASTIC ELASTOMER FOAM PARTICLES AND MOLDED BODY OF SAME

CROSS-REFERENCE TO RELATED APPLICATIONS

This application is a U.S. national phase application filed under 35 U.S.C. § 371 of International Application Number PCT/JP2020/017430, filed Apr. 23, 2021, designating the United States, which claims priority from Japanese Application Number 2019-093829, filed May 17, 2019.

FIELD OF THE INVENTION

The present invention relates to expanded thermoplastic elastomer beads and a molded article of the same.

BACKGROUND OF THE INVENTION

In view of the fact that thermoplastic elastomers have excellent flexibility, repulsion elasticity, etc., they are used in various applications, such as buffer materials, vibration insulating materials, sporting goods, and automobile parts.

Since expanded thermoplastic elastomer beads molded articles are able to achieve lightness in weight while maintaining excellent properties inherent to the thermoplastic elastomer, such as flexibility and repulsion elasticity, there are expectations for development of further applications thereof in the fields of sporting goods, automobile parts, building materials, etc.

With respect to such a thermoplastic elastomer, expanded beads molded articles having interconnected voids are disclosed as expanded beads molded articles having more excellent flexibility, recoverability, etc. For example, PTL 1 describes an expanded beads molded article of expanded olefin-based thermoplastic elastomer beads, wherein a voidage of the expanded beads molded article is 5 to 40%, a density of the expanded beads molded article is 30 to 150 g/L, and a flexural modulus of the olefin-based thermoplastic elastomer that constitutes the expanded beads molded article is 10 to 100 MPa.

In addition, as for expanded beads that are capable of molding an expanded beads molded article having voids as mentioned above, PTL 2 describes a method for producing expanded beads provided with through-holes, composed of a block copolymer of a polyethylene block and an ethylene/α-olefin copolymer block.

CITATION LIST

Patent Literature

PTL 1: JP 2018-80226 A
PTL 2: JP 2018-80227 A

SUMMARY OF INVENTION

However, as for the expanded beads described in PTLs 1 and 2, a variation occasionally arose in the voidage in the expanded beads molded article depending upon a filling method of expanded beads, a shape of the expanded beads molded article, etc. In addition, if the density would be made low in order to more enhance the flexibility of the expanded beads molded article, there was involved such an inconvenience that not only a high voidage cannot be maintained, but also it is difficult to control the voidage to a desired level. Furthermore, more improvements in physical properties, such as durability and heat resistance, were occasionally required depending upon the application of the expanded beads molded article.

In view of the existence of the aforementioned problems, the present invention has been made, and an object thereof is to provide an expanded thermoplastic elastomer beads molded article which is high in voidage and uniform and has excellent lightness in weight, flexibility durability, heat resistance, etc. and expanded thermoplastic elastomer beads that are capable of molding the foregoing expanded beads molded article.

As a result of extensive and intensive investigations made by the present inventors, it has been found that by adopting the constitutions shown below, the aforementioned problems can be solved, thereby leading to accomplishment of the present invention.

Specifically, the present invention is as follows.

[1] Expanded cylindrical thermoplastic elastomer beads provided with through-holes, the expanded thermoplastic elastomer beads including a core layer in a foamed state constituted of a base polymer containing a thermoplastic elastomer and a cover layer covering the core layer and constituted of a thermoplastic polymer, wherein a coefficient of dynamic friction of the thermoplastic polymer that constitutes the cover layer is 0.8 or less, and a difference [(Tms)−(Tmc)] between a melting point (Tmc) of the base polymer that constitutes the core layer and a melting point (Tms) of the thermoplastic polymer that constitutes the cover layer is −20° C. or more and 20° C. or less.

[2] The expanded thermoplastic elastomer beads as set forth in the above [1], wherein the thermoplastic elastomer is an olefin-based thermoplastic elastomer.

[3] The expanded thermoplastic elastomer beads as set forth in the above [2], wherein the olefin-based thermoplastic elastomer is a block copolymer of a polyethylene block and an ethylene/α-olefin copolymer block.

[4] The expanded thermoplastic elastomer beads as set forth in any one of the above [1] to [3], wherein the base polymer further contains a polyethylene-based resin, and the content of the polyethylene-based resin in the base polymer is 3% by mass or more and 40% by mass or less.

[5] The expanded thermoplastic elastomer beads as set forth in any one of the above [1] to [4], wherein the thermoplastic polymer is a polyolefin-based resin.

[6] The expanded thermoplastic elastomer beads as set forth in the above [5], wherein the polyolefin-based resin is a polyethylene-based resin.

[7] The expanded thermoplastic elastomer beads as set forth in any one of the above [1] to [6], wherein the difference [(Tms)−(Tmc)] between the melting point (Tmc) of the base polymer and the melting point (Tms) of the thermoplastic polymer is −10° C. or more and 15° C. or less.

[8] The expanded thermoplastic elastomer beads as set forth in any one of the above [1] to [7], wherein a ratio [(Ds)/(Dc)] of the outer layer thickness (Ds) that is a distance in the thickness direction from the surface of the expanded bead to a cell structure part having a cell structure to the inner layer thickness (Dc) that is a distance in the thickness direction from the inner surface of the expanded bead on the through-hole side to the cell structure part is 2 or more.

[9] The expanded thermoplastic elastomer beads as set forth in any one of the above [1] to [8], wherein a xylene insoluble content by the hot xylene extraction method is 30% by mass or more and 70% by mass or less.

[10] The expanded thermoplastic elastomer beads as set forth in any one of the above [1] to [9], wherein an apparent density is 10 kg/m$^3$ or more and 250 kg/m$^3$ or less.

[11] A expanded thermoplastic elastomer beads molded article formed by subjecting cylindrical expanded thermoplastic elastomer beads provided with through-holes to in-mold molding, the expanded thermoplastic elastomer beads including a core layer constituted of a base polymer containing a thermoplastic elastomer and a cover layer covering the core layer and constituted of a thermoplastic polymer, wherein a voidage is 15% or more, and a density is 10 kg/m$^3$ or more and 200 kg/m$^3$ or less, and furthermore, the product of a tensile strength (MPa) and a tensile elongation (%) is 5 or more.

[12] The expanded thermoplastic elastomer beads molded article as set forth in the above [11], wherein a coefficient of variation of density (C.V) is 0.005 to 0.020.

In accordance with the present invention, it is possible to provide an expanded thermoplastic elastomer beads molded article which is high in voidage and uniform and has excellent lightness in weight, flexibility, durability, heat resistance, etc. and also expanded thermoplastic elastomer beads that are capable of molding the foregoing expanded beads molded article.

DESCRIPTION OF EMBODIMENTS

[Expanded Thermoplastic Elastomer Beads]

The expanded thermoplastic elastomer beads of the present invention (hereinafter also referred to simply as "expanded thermoplastic elastomer beads" or "expanded beads") are expanded cylindrical thermoplastic elastomer beads provided with through-holes, the expanded thermoplastic elastomer beads including a core layer in a foamed state constituted of a base polymer containing a thermoplastic elastomer and a cover layer covering the core layer and constituted of a thermoplastic polymer, wherein a coefficient of dynamic friction of the thermoplastic polymer that constitutes the cover layer is 0.8 or less, and a difference [(Tms)−(Tmc)] between a melting point (Tmc) of the base polymer that constitutes the core layer and a melting point (Tms) of the thermoplastic polymer that constitutes the cover layer is −20° C. or more and 20° C. or less.

<Core Layer>

The base polymer that constitutes the core layer contains a thermoplastic elastomer (hereinafter also referred to as "TPE"). Examples of TPE include an olefin-based thermoplastic elastomer, a urethane-based thermoplastic elastomer, and a styrene-based thermoplastic elastomer. Of these, the thermoplastic elastomer is preferably an olefin-based thermoplastic elastomer (hereinafter also referred to as "TPO").

Examples of TPO include a mixture constituted of a propylene-based resin and an ethylene-based rubber; and a block copolymer of a polyethylene block and an ethylene/α-olefin copolymer block. From the viewpoint of flexibility, heat resistance, etc. of the expanded beads molded article, the olefin-based thermoplastic elastomer is preferably a block copolymer of a polyethylene block and an ethylene/α-olefin copolymer block.

In the mixture constituted of a propylene-based resin and an ethylene-based rubber, examples of the propylene-based resin include a propylene homopolymer; and a copolymer of propylene and ethylene or an α-olefin having 4 to 8 carbon atoms. Meanwhile, examples of the ethylene-based rubber include a copolymer of ethylene and an α-olefin having 3 to 8 carbon atoms; and a copolymer of ethylene and a non-conjugated diene, such as 5-vinyl-2-norbornene, 5-ethylidene-2-norbornene, 5-methylene-2-norbornene, and dicyclopentadiene.

In the block copolymer of a polyethylene block and an ethylene/α-olefin copolymer block, examples of the polyethylene block include an ethylene homopolymer; and a copolymer of ethylene and an α-olefin having 3 to 8 carbon atoms. Meanwhile, the ethylene/α-olefin copolymer block is preferably a block of a copolymer of ethylene and an α-olefin having 3 to 20 carbon atoms, and examples of the α-olefin which is copolymerized with ethylene include propylene, 1-butene, 1-pentene, 1-hexene, 1-heptene, 1-octene, 1-nonene, 1-decene, 3-methyl-1-butene, and 4-methyl-1-pentene. From the viewpoint of easiness of industrial availability, various properties, economy, etc., the α-olefin which is copolymerized with ethylene is preferably propylene, 1-butene, 1-hexene, or 1-octene, and especially preferably 1-octene.

A proportion of the ethylene/α-olefin copolymer block in the block copolymer of a polyethylene block and an ethylene/α-olefin copolymer block is preferably 1% by mass or more, and more preferably 5% by mass or more, and preferably 99% by mass or less, and more preferably 95% by mass or less relative to the mass of the block copolymer. The proportion of the polyethylene block and the proportion of the ethylene/α-olefin copolymer block are calculated on the basis of data obtained through differential scanning calorimetry (DSC) or nuclear magnetic resonance (NMR).

A proportion of the ethylene unit in the polyethylene block is preferably 95% by mass or more, and more preferably 98% by mass or more relative to the mass of the polyethylene block. Meanwhile, a proportion of the α-olefin unit in the ethylene/α-olefin copolymer block is preferably 5% by mass or more, more preferably 10% by mass or more, and still more preferably 15% by mass or more relative to the mass of the ethylene/α-olefin copolymer block.

As the TPO, a commercially available product may be used. Examples thereof include a trade name "INFUSE", available from The Dow Chemical Company; a trade name "AFFINITY", available from The Dow Chemical Company; a trade name "THERMORUN", available from Mitsubishi Chemical Corporation; a trade name "MILASTOMER", available from Mitsui Chemicals, Inc.; a trade name "TAFMER", available from Mitsui Chemicals, Inc.; a trade name "SUMITOMO TPE", available from Sumitomo Chemical Co., Ltd.; and a trade name "PRIME TPO", available from Prime Polymer Co., Ltd.

(Melting Point (Tmc) of Base Polymer)

From the viewpoint of heat resistance, etc. of the expanded beads molded article, a melting point (Tmc) of the base polymer is preferably 110° C. or higher, and more preferably 115° C. or higher, and preferably 140° C. or lower, and more preferably 135° C. or lower.

The melting point (Tmc) of the base polymer means a melting peak temperature measured on the basis of heat flux differential scanning calorimetry as described in JIS K7121: 2012. As for conditioning of a test piece, "(2) When measuring the melting temperature after performing a determined heat treatment" is adopted, and a heating rate and a cooling rate adopted are both 10° C./min. In the case where a plurality of melting peaks appear on the DSC curve, the melting point is a peak top temperature of the melting peak having a largest area. In the case where the base polymer contains other polymer than TPE, additives, and the like, the melting point obtained by using the base polymer containing the additives and the like as a test piece and performing the aforementioned measurement is defined as the melting point (Tmc) of the base polymer.

(Melt Flow Rate (MFR) of TPE)

The MFR of TPE which is contained in the base polymer is preferably 2 g/10 min or more, more preferably 3 g/10 min or more, and still more preferably 4 g/10 min or more, and preferably 10 g/10 min or less, more preferably 8 g/10 min or less, and still more preferably 7 g/10 min or less. When the MFR of TPE falls within the aforementioned range, not only the expanded beads are more excellent in moldability, but also an expanded beads molded article having desired physical properties can be readily obtained.

The MFR of TPE is a value measured under conditions of a temperature of 190° C. and a load of 2.16 kg in conformity with JIS K7210-1:2014. In the case where TPE contains additives, etc., the MFR of TPE containing additives and the like is defined as the MFR of TPE.

(Flexural Modulus of TPE)

From the viewpoint of flexibility, etc., a flexural modulus of TPE which is contained in the base polymer is preferably 10 MPa or more, more preferably 15 MPa or more, and still more preferably 20 MPa or more, and preferably 50 MPa or less, more preferably 40 MPa or less, still more preferably 35 MPa or less, and yet still more preferably 30 MPa or less. The flexural modulus of TPE is a value measured in conformity with JIS K7171:2016.

(Vicat Softening Temperature of Base Polymer)

From the viewpoint of heat resistance, etc. of the expanded beads molded article, a Vicat softening temperature of the base polymer is preferably 70° C. or higher, more preferably 80° C. or higher, and still more preferably 90° C. or higher, and preferably 140° C. or lower, and more preferably 135° C. or lower.

The Vicat softening temperature of the base polymer is a value obtained by measuring a test piece of 20 mm (length)×20 mm (width)×3.5 mm (thickness) with an HDT/VICAT softening point tester "TM4123", available from Ueshima Seisakusho Co., Ltd. in conformity with ISO 306:2013/A50. In the case where the base polymer contains other polymer than TPE, additives, and the like, the Vicat softening temperature obtained by using the base polymer containing the additives and the like as a test piece and performing the aforementioned measurement is defined as the Vicat softening temperature of the base polymer.

It is preferred that the base polymer further contains a polyethylene-based resin. In particular, in the case where TPE that constitutes the core layer is TPO, it is preferred that the core layer further contains a polyethylene-based resin. When not only TPE that constitutes the core layer is TPO, but also the polyethylene-based resin is contained, while maintaining the excellent properties of TPO, not only foamability, the heat resistance, etc. of the expanded beads are more excellent, but also shrinkage at the time of molding and expansion is more effectively inhibited, and furthermore, the expanded beads molded article is excellent in heat resistance, etc.

Examples of the polyethylene-based resin include ethylene-based hydrocarbon homopolymers, such as very low density polyethylene (VLDPE), low density polyethylene (LDPE), linear low density polyethylene (LLDPE), medium density polyethylene (MDPE), and high density polyethylene (HDPE). These polyethylene-based resins are used alone or in combination of two or more thereof. Of these, from the viewpoint of heat resistance, etc., the polyethylene-based resin is preferably at least one selected from high density polyethylene and linear low density polyethylene, and more preferably high density polyethylene.

The content of the polyethylene-based resin in the base polymer is preferably 3% by mass or more and 40% by mass or less, more preferably 5% by mass or more and 35% by mass or less, still more preferably 8% by mass or more and 30% by mass or less, and yet still more preferably 10% by mass or more and 25% by mass or less. When the content of the polyethylene-based resin in the core layer falls within the aforementioned range, the foamability, the heat resistance, the moldability, and so on of the expanded beads can be more improved while maintaining the excellent properties of TPO, and the expanded beads molded article is excellent in heat resistance, etc., too.

(Melting Point of Polyethylene-Based Resin)

From the viewpoint of moldability of the expanded beads, the heat resistance, etc. of the expanded beads molded article, a melting point of the polyethylene-based resin which is contained in the base polymer is preferably 110° C. or higher, more preferably 120° C. or higher, and still more preferably 125° C. or higher, and preferably 145° C. or lower, more preferably 140° C. or lower, and still more preferably 135° C. or lower. The melting point of the polyethylene-based resin is measured by the same method as that for the melting point of the base polymer as mentioned above.

In the case where the base polymer contains the polyethylene-based resin, it is preferred that the melting point of the polyethylene-based resin is higher than the melting point of TPE. In the case where the melting point of the polyethylene-based resin is higher than the melting point of TPE, the expanded beads are more excellent in moldability, and the heat resistance of the obtained molded article is more enhanced. From the aforementioned viewpoint, the melting point of the polyethylene-based resin is higher by at least 3° C. than the melting point of TPE, and more preferably higher by at least 5° C. than the melting point of TPE. In the case where the melting point of the polyethylene-based resin is higher than the melting point of TPE, though there is no upper limit of the difference of the temperature, it is generally about 20° C.

(MFR of Polyethylene-Based Resin)

MFR of the polyethylene-based resin which is contained in the base polymer is preferably 2 g/10 min or more, more preferably 5 g/10 min or more, and still more preferably 8 g/10 min or more, and preferably 50 g/10 min or less, more preferably 40 g/10 min or less, and still more preferably 35 g/10 min or less. When the MFR of the polyethylene-based resin falls within the aforementioned range, not only the expanded beads are more excellent in foamability, moldability, etc., but also the expanded beads molded article is more excellent in heat resistance, etc. The MFR of the polyethylene-based resin is measured by the same method as that for the MFR of TPE as mentioned above.

In the case where the base polymer contains the polyethylene-based resin, a difference [(II)−(I)] between MFR(II) of the polyethylene-based resin and MFR(I) of TPO is preferably 1 g/10 min or more and 35 g/10 min or less. When the difference of MFR [(II)−(I)] falls within the aforementioned range, the expanded beads are more excellent in foamability, and the expanded beads molded article which is more excellent in lightness in weight, flexibility, etc. can be obtained. From the aforementioned viewpoint, the difference of MFR [(II)−(I)] is more preferably 2 g/10 min or more and 25 g/10 min or less, still more preferably 3 g/10 min or more and 20 g/10 min or less, and especially preferably 5 g/10 min or more and 17 g/10 min or less.

(Flexural Modulus of Polyethylene-Based Resin)

A flexural modulus of the polyethylene-based resin which is contained in the base polymer is preferably 100 MPa or more, more preferably 300 MPa or more, and still more preferably 500 MPa or more, and preferably 1,000 MPa or less, more preferably 950 MPa or less, and still more preferably 900 MPa or less. When the flexural modulus of the polyethylene-based resin falls within the aforementioned range, the expanded beads molded article is excellent in heat resistance while maintaining the excellent flexibility of TPO more favorable. The flexural modulus of the polyethylene-based resin is measured by the same method as that for the flexural modulus of TPE as mentioned above.

(Other Polymer)

The base polymer may contain other polymer than TPE within a range where the purpose or effects of the present invention are not hindered. Examples of the other polymer include thermoplastic resins, such as a polyethylene-based resin, a polypropylene-based resin, a polybutene-based resin, and a polystyrene-based resin. The content of the other polymer in the core layer is preferably 40% by mass or less, more preferably 20% by mass or less, still more preferably 10% by mass or less, and yet still more preferably 5% by mass or less, and it is especially preferred that the other polymer than TPE is not contained (0% by mass).

(Other Additives)

Other additives can be added to the core layer within a range where the purpose or effects of the present invention are not hindered. Examples of the other additives include cell controlling agents, flame retardants, flame retardant aids, cell nucleating agents, plasticizers, antistatic agents, antioxidants, ultraviolet ray inhibitors, light stabilizers, conductive fillers, antibacterial agents, and lubricants. Examples of the cell controlling agents include inorganic powder, such as talc, mica, zinc borate, calcium carbonate, silica, titanium oxide, gypsum, zeolite, borax, aluminum hydroxide, and carbon; and organic powder, such as a phosphate-based nucleating agent, a phenol-based nucleating agent, an amine-based nucleating agent, and a polyfluoroethylene-based resin powder. The content of the additives in the core layer is preferably 20% by mass or less, more preferably 10% by mass or less, and still more preferably 5% by mass or less.

<Cover Layer>

Examples of the thermoplastic polymer that constitutes the cover layer include, in addition to the aforementioned thermoplastic elastomers, thermoplastic resins, such as a polyolefin-based resin, a polystyrene-based resin, a polyester-based resin, a polyamide-based resin, and a polycarbonate-based resin. These are used alone or in combination of two or more thereof. Above all, in the case where TPE that constitutes the core layer is TPO, from the viewpoint of adhesiveness to the core layer, it is preferred that the thermoplastic polymer that constitutes the cover layer is composed mainly of a polyolefin-based resin. The content of the other thermoplastic polymer than the polyolefin-based resin in the cover layer is preferably 10% by mass or less, more preferably 5% by mass or less, and still more preferably substantially 0% by mass.

Examples of the polyolefin-based resin include a polyethylene-based resin and a polypropylene-based resin. These are used alone or in combination of two or more thereof. Among the polyolefin-based resins, from the viewpoint of weather resistance, etc., the thermoplastic polymer is preferably a polyethylene-based resin.

From the viewpoint of filling properties, etc. of the expanded beads as mentioned later, the polyethylene-based resin is preferably at least one selected from low density polyethylene, linear low density polyethylene, and high density polyethylene, and more preferably at least one selected from linear low density polyethylene and high density polyethylene.

(Other Additives)

Other additives can be added to the cover layer within a range where the purpose or effects of the present invention are not hindered. Examples of the other additives are the same as the other additives which can be added to the core layer. The content of the aforementioned additives in the cover layer is preferably 20% by mass or less, more preferably 10% by mass or less, and still more preferably 5% by mass or less.

(Coefficient of Dynamic Friction of Thermoplastic Polymer)

A coefficient of dynamic friction of the thermoplastic polymer that constitutes the cover layer is 0.8 or less. In the case where the coefficient of dynamic friction of the thermoplastic polymer is more than 0.8, the filling properties of the expanded beads are lowered, so that there is a concern that a variation in the voidage of the expanded beads molded article arises, and fusion bonding between the expanded beads becomes insufficient, so that there is a concern that the durability is lowered. From the aforementioned viewpoint, the coefficient of dynamic friction of the thermoplastic polymer is preferably 0.6 or less, more preferably 0.4 or less, and still more preferably 0.2 or less. Although a lower limit value of the coefficient of dynamic friction of the thermoplastic polymer is not particularly limited, it is generally 0.1.

Conventionally, as for the expanded thermoplastic elastomer beads molded article having voids, there was a case where the filling properties become insufficient depending upon the filling method of expanded beads, the shape of the expanded beads molded article, and so on, so that a variation arises in the voidage in the expanded beads molded article. In contrast, the expanded beads of the present invention are excellent in the filling properties in view of the fact that the thermoplastic polymer having a low coefficient of dynamic friction covers the core layer in a foamed state, which is constituted of the base polymer containing the thermoplastic elastomer. In consequence, the expanded beads molded article obtained through in-mold molding of the expanded beads of the present invention is not only uniform in terms of the voidage but also excellent in durability.

The coefficient of dynamic friction of the thermoplastic polymer is measured in conformity with "Plastics—Film and sheeting—Determination of coefficients of friction" described in JIS K7125:1999. Specifically the measurement is performed by using a test piece of 63 mm×63 mm×4 mm; using a sliding piece having a total mass of 200 g; not sheathing the bottom surface of the sliding piece by another material; using a coated steel panel (available from Nisshin Steel Co., Ltd., a trade name: Moonstar GL Color SELiOS/GL Enamel Clean/Stroke Ream, thickness: 0.27 mm) as a test table; not using a spring; and adopting a testing speed of 500 mm/min and a testing distance of 80 mm. Then, a value obtained by ignoring a first maximum load and dividing an average value (N) of a friction force until 6 cm after detecting a relative shear movement at the contact interface by a normal force of 1.95 (N) is defined as the coefficient of dynamic friction. In the case where the thermoplastic polymer contains additives, such as a lubricant, and the like, a coefficient of dynamic friction obtained by performing the aforementioned measurement using the thermoplastic polymer containing additives and the like as the test piece is defined as the coefficient of dynamic friction of the thermoplastic polymer.

(Melting Point (Tms) of Thermoplastic Polymer)

From the viewpoint of moldability, heat resistance, etc., a melting point (Tms) of the thermoplastic polymer is preferably 110° C. or higher, more preferably 120° C. or higher, and still more preferably 125° C. or higher, and preferably 145° C. or lower, more preferably 140° C. or lower, and still more preferably 135° C. or lower. The melting point (Tms) of the thermoplastic polymer is measured by the same method as that for the melting point (Tmc) of TPE as mentioned above.

(MFR of Thermoplastic Polymer)

MFR of the thermoplastic polymer is preferably 2 g/min or more, more preferably 4 g/10 min or more, and still more preferably 6 g/10 min or more, and preferably 50 g/10 min or less, more preferably 30 g/10 min or less, and still more preferably 25 g/10 min or less. When MFR of the thermoplastic polymer falls within the aforementioned range, not only the expanded beads are more excellent in foamability, moldability, etc., but also the expanded beads molded article is more excellent in heat resistance, etc. MFR of the thermoplastic polymer is measured by the same method as that for MFR of TPE as mentioned above.

(Flexural Modulus of Thermoplastic Polymer)

A flexural modulus of the thermoplastic polymer is preferably 100 MPa or more, more preferably 300 MPa or more, and still more preferably 500 MPa or more, and preferably 1,000 MPa or less, more preferably 950 MPa or less, and still more preferably 900 MPa or less. When the flexural modulus of the thermoplastic polymer falls within the aforementioned range, in the expanded beads molding article, collapse of voids of the expanded beads at the time of in-mold molding is inhibited while maintaining the excellent flexibility of TPO more favorable, and therefore, a molded article which is higher in the voidage and more excellent in lightness in weight, flexibility, heat resistance, etc. can be obtained. The flexural modulus of the thermoplastic polymer is measured by the same method as that for the flexural modulus of TPE as mentioned above.

(Vicat Softening Temperature of Thermoplastic Polymer)

From the viewpoint of heat resistance, etc. of the expanded beads molded article, a Vicat softening temperature of the thermoplastic polymer is preferably 100° C. or higher, more preferably 105° C. or higher, and still more preferably 110° C. or higher, and preferably 145° C. or lower, more preferably 140° C. or lower, and still more preferably 135° C. or lower. The Vicat softening temperature of the thermoplastic polymer is measured by the same method as that for the Vicat softening temperature of TPE as mentioned above.

(Difference Between Melting Point (Tmc) of Base Polymer and Melting Point (Tms) of Thermoplastic Polymer)

A difference [(Tms)−(Tmc)] between the melting point (Tmc) of the base polymer that constitutes the core layer and the melting point (Tms) of the thermoplastic polymer that constitutes the cover layer is −20° C. or more and 20° C. or less. When the difference [(Tms)−(Tmc)] falls within −20° C. or more and 20° C. or less, excellent fusion bonding properties are revealed, and even in the case where the density is low, the high voidage can be maintained.

When the difference [(Tms)−(Tmc)] is smaller than −20° C., in particular, in a low-density expanded beads molded article, secondary expansion of the expanded beads cannot be sufficiently inhibited, and therefore, there is a concern that the voidage is decreased. From the aforementioned viewpoint, the difference [(Tms)−(Tmc)] is preferably −15° C. or more, more preferably −10° C. or more, and still more preferably 0° C. or more.

On the other hand, when the difference [(Tms)−(Tmc)] is larger than 20° C., the foamability is lowered, so that there is a concern that the voidage of the expanded beads molded article is decreased, and there is a concern that the fusion bonding properties of the expanded beads are lowered. From the aforementioned viewpoint, the difference [(Tms)−(Tmc)] is preferably 15° C. or less, more preferably 12° C. or less, and still more preferably 10° C. or less.

In the expanded beads molded article obtained through molding of the expanded beads of the present invention, the voids are formed of voids existing between the expanded beads that constitute the expanded beads molded article and voids to be formed as through-holes in the expanded beads themselves. Conventionally, an expanded thermoplastic elastomer beads molded article having voids involved such a problem that when the density is decreased in order to more enhance its flexibility, not only the high voidage cannot be maintained, but also it is difficult to control the voidage to a desired range. The cause for this may be considered as follows. On the occasion of subjecting the expanded thermoplastic elastomer beads to in-mold molding, the heated expanded beads undergo secondary expansion. The thermoplastic elastomer is more elastic than polyolefin-based resins, etc., and the secondary expansion force tends to be stronger. Accordingly, it may be considered that in view of the fact that the expanded beads undergo secondary expansion at the time of molding, the voids existing between the expanded beads are collapsed, and therefore, the voidage is lowered particularly in a low-density molded article. This becomes more remarkable in the olefin-based thermoplastic elastomer among thermoplastic elastomers.

The expanded beads of the present invention can maintain a high voidage even in the case where the density is low. Although the reason why the expanded beads of the present invention become expanded beads which are capable of molding an expanded beads molded article having a high voidage is not elucidated yet, the following reason may be considered.

The expanded cylindrical beads provided with through-holes of the present invention include a core layer in a foamed state constituted of a base polymer containing a thermoplastic elastomer and a cover layer covering the core layer and constituted of a thermoplastic polymer, wherein a difference [(Tms)−(Tmc)] between a melting point (Tmc) of the base polymer that constitutes the core layer and a melting point (Tms) of the thermoplastic polymer that constitutes the cover layer is −20° C. or more and 20° C. or less. In consequence, it may be considered that in view of the fact that the secondary expansion of the core layer at the time of in-mold molding is inhibited by the cover layer, a high voidage can be maintained.

From the viewpoint of inhibiting the secondary expansion of the expanded beads at the time of in-mold molding, it is preferred that the cover layer covering the core layer covers the almost whole of the outer surface of the core layer, and it is more preferred that the cover layer completely covers the whole of the outer surface of the core layer. A core layer portion which is not covered by the cover layer may be existent within a range where the purpose or effects of the present invention are not hindered.

From the same viewpoint, the cover layer is preferably in a non-foamed state or a substantially non-foamed state, and more preferably in a non-foamed state. The cover layer may be in a slightly foamed state within a range where the purpose or effects of the present invention are not hindered.

In the expanded beads of the present invention, a mass ratio of the cover layer to the core layer is preferably 1/99 to 20/80. When the mass ratio of the cover layer to the core layer falls within the aforementioned range, not only the fusion bonding properties are more excellent, but also the secondary expansion at the time of in-mold molding can be more surely inhibited. From the aforementioned viewpoint, the mass ratio of the cover layer to the core layer is more preferably 2/98 to 15/85, and still more preferably 5/95 to 10/90.

As for the expanded beads of the present invention, a difference [(Ts)–(Tc)] between a Vicat softening temperature (Tc) of the base polymer that constitutes the core layer and a Vricat softening temperature (Ts) of the thermoplastic polymer that constitutes the cover layer is preferably –5° C. or more and 35° C. or less. It may be considered that when the difference [(Ts)–(Tc)] falls within the aforementioned range, the secondary expansion of the core layer at the time of in-mold molding is readily much more inhibited by the cover layer, and therefore, expanded beads which are capable to more easily undergo molding of an expanded beads molded article having a high voidage are provided. From the aforementioned viewpoint, the difference [(Ts)–(Tc)] is more preferably 0° C. or more and 20° C. or less, and still more preferably 5° C. or more and 15° C. or less.

The Vicat softening temperature is measured in conformity with ISO 306:2013/A50. In each of the base polymer and the thermoplastic polymer, the Vicat softening temperature may be measured in a non-crosslinked state (virgin raw material) or may be measured in a crosslinked state (crosslinked raw material). In the case where expanded beads which are produced by crosslinking the expanded beads are subjected to in-mold molding, it is preferred that the Vicat softening temperature of the crosslinked raw material satisfies the aforementioned relation.

[Production Method of Expanded Thermoplastic Elastomer Beads]

The expanded thermoplastic elastomer beads can be, for example, produced by a method including the following steps (A) to (E)

Step (A): a granulating step of separately melt kneading a base polymer that constitutes a core layer and a thermoplastic polymer that constitutes the cover layer and coextruding the both polymers, to obtain multi-layered resin particles provided with through-holes, which is formed of the core layer and the cover layer covering the core layer;

Step (B): a dispersing step of dispersing the multi-layered resin particles and a crosslinking agent in a dispersing medium in a closed vessel;

Step (C): a crosslinking step of heating to a temperature (crosslinking temperature) equal to or higher than the temperature at which the base polymer that constitutes the core layer is softened, and the crosslinking agent is substantially decomposed, thereby crosslinking the multi-layered resin particles containing the base polymer to obtain crosslinked multi-layered resin particles (hereinafter also referred to simply as "crosslinked particles");

Step (D): an impregnating step of impregnating the multi-layered resin particles or crosslinked multi-layered resin particles with a blowing agent by holding at a predetermined temperature (impregnation temperature) for a predetermined time (impregnation-holding time); and Step (E): an expanding step of releasing the blowing agent-impregnated expandable crosslinked multi-layered resin particles which have been heated at a predetermined temperature (expansion temperature) from the inside of the closed vessel into an atmosphere under a pressure lower than a pressure within the closed vessel, thereby expanding the resin particles to produce expanded beads.

<Step (A)>

In the step (A), for example, an extruder having an extruder for forming core layer; an extruder for forming cover layer; and a die for foaming multi-layered strand form which is installed on the outlet sides of these extruders can be used. Into the extruder for forming core layer, the base polymer that constitutes the core layer and an additive to be optionally added are fed and melt kneaded to form a core layer-forming melt kneaded product; and into the extruder for forming cover layer, the thermoplastic polymer that forms the cover layer and an additive to be optionally added are fed and melt kneaded to form a cover layer-forming melt kneaded product. The core layer-forming melt kneaded product and the cover layer-forming melt kneaded product are introduced into the die for forming multi-layered strand form and joined to form a complex having a sheath-core structure, which is composed of the core layer in a non-foamed state and the cover layer in a non-foamed state, which covers the core layer. Then, the complex is extruded from a small orifice of a die attached to the tip of the extruder into a form of a cylindrical strand form provided with through-holes, and after cooling with water, the resultant is cut with a pelletizer (strand cutting method) so as to have a predetermined mass, whereby multi-layered resin particles having a hollow shape provided with through-holes and composed of the core layer and the cover layer covering the core layer can be obtained. As the method for cutting the extruded complex, in addition to the aforementioned method, an underwater cutting method in which the complex is extruded into water and cut, a hot cutting method in which the complex is extruded into air and immediately thereafter, cut, and the like can also be adopted.

The multi-layered resin particles may have a circular cylindrical shape, an elliptical cylindrical shape, a triangular cylindrical shape, a quadrangular cylindrical shape, a pentagonal or more polygonal cylindrical shape, a cylindrical shape having a shape with plural protrusions, for example, a star shape, as the cross-sectional shape orthogonal to a punching direction, a cylindrical shape having an indeterminate shape as the cross-sectional shape orthogonal to a punching direction, or the like. Of these, the multi-layered resin particles preferably have a circular cylindrical shape.

The shape of the through-hole which the multi-layered resin particles have is not particularly limited, and it is typically a circular shape in the cross-sectional shape orthogonal to a punching direction. The through-hole may also have an elliptical shape, a quadrate shape, a rectangular shape, a trapezoidal shape, a triangular shape, a pentagonal or more polygonal, a shape with plural protrusions, for example, a star shape, an indeterminate shape, or the like.

From the viewpoint of recoverability of the expanded beads molded article within a short time, an inside diameter of the through-hole of the multi-layered resin particle (major axis of the aforementioned cross-sectional shape) is preferably 1.0 mm or more, more preferably 1.3 mm or more, and still more preferably 1.5 mm or more, and preferably 7.0 mm or less, and more preferably 5.0 mm or less.

From the viewpoint of filling properties, a length in the punching direction of the through-hole of the multi-layered resin particle is preferably 1 mm or more, and preferably 10 mm or less, and more preferably 7 mm or less.

An average mass per multi-layered resin particle is preferably 0.5 mg or more, and more preferably 1 mg or more, and preferably 8 mg or less, and more preferably 5 mg or less. When the average mass per multi-layered resin particle falls within the aforementioned range, an expanded beads molded article which is excellent in foamability, moldability, etc. and which has excellent physical properties and appearance can be obtained. The average mass of the multi-layered resin particles is a value obtained by dividing the mass [mg] of 100 randomly selected multi-layered resin particles by 100.

An average aspect ratio of the multi-layered resin particles is preferably 1.5 or less, more preferably 1.3 or less, and still more preferably 1.1 or less. The average aspect ratio of the multi-layered resin particles is a value obtained by measuring 100 randomly selected multi-layered resin particles (mini-pellets) for a maximum length (L) and a cross-sectional maximum diameter (D) in the cross section of the particle in a direction orthogonal to the longitudinal direction of the maximum length, calculating a ratio (L/D), and arithmetically averaging the resulting values.

In the case of optionally adding additives, such as a cell controlling agents, a flame retardants, a flame retardant aids, a cell nucleating agents, a plasticizers, an antistatic agents, an antioxidants, an ultraviolet ray inhibitors, a light stabilizers, a conductive fillers, and an antibacterial agents, to the multi-layered resin particles composed of the core layer and the cover layer, the additives can be added in the step (A). Examples of the cell controlling agent include inorganic powders, such as talc, mica, zinc borate, calcium carbonate, silica, titanium oxide, gypsum, zeolite, borax, aluminum hydroxide, and carbon; and organic powders, such as a phosphate-based nucleating agent, a phenol-based nucleating agent, an amine-based nucleating agent, and a polyfluoroethylene resin powder. In the case of adding the cell controlling agent, the content of the cell controlling agent in the multi-layered resin particles is preferably 0.01 to 1 part by mass based on 100 parts by mass of the multi-layered resin particles.

<Step (B)>

In the step (B), for example, in a vessel that can be hermetically closed and withstands heating and pressurization, such as an autoclave, the multi-layered resin particles and a crosslinking agent can be dispersed in a dispersing medium using, for example, a stirrer.

The dispersing medium is not particularly limited so long as it does not dissolve the multi-layered resin particles therein, and examples thereof include water and an alcohol, such as ethylene glycol, glycerin, methanol, and ethanol. Above all, water is preferred.

The crosslinking agent is not particularly limited so long as it crosslinks TPE therewith. Examples of the crosslinking agent include peroxides, such as 2,5-t-butyl perbenzoate (10-hour half-life temperature: 104° C.), 1,1-bis-t-butylperoxycyclohexane (10-hour half-life temperature: 91° C.), 1,1-di(t-hexylperoxy)cyclohexane (10-hour half-life temperature: 87° C.), and t-butylperoxy-2-ethylhexyl monocarbonate (10-hour half-life temperature: 99° C.). These can be used alone or in combination of two or more thereof. Of these, from the standpoint that the through-holes are hardly collapsed, a crosslinking agent having a 10-hour half-life temperature of preferably 75° C. or higher, and more preferably 80° C. or higher, and preferably 120° C. or lower, more preferably 105° C. or lower, and still more preferably 100° C. or lower is preferably used.

A blending amount of the crosslinking agent is preferably 0.1 parts by mass or more, and more preferably 0.2 parts by mass or more, and preferably 5 parts by mass or less, and more preferably 2.5 parts by mass based on 100 parts by mass of the multi-layered resin particles. When the blending amount of the crosslinking agent falls within the foregoing range, crosslinked particles in which efficiency of the crosslinking is improved and which have a desired xylene insoluble content can be obtained, and the crosslinked particles are excellent in foamability and are able to give a strength to TPE such that they can thoroughly withstand the expansion.

In the step (B), in order to prevent fusion bonding between the multi-layered resin particles, it is preferred to further add a dispersant to the dispersing medium. Examples of the dispersant include organic dispersants, such as polyvinyl alcohol, polyvinylpyrrolidone, and methyl cellulose; and sparingly soluble inorganic salts, such as aluminum oxide, zinc oxide, kaolin, mica, magnesium phosphate, and tricalcium phosphate. These can be used alone or in combination of two or more thereof. Of these, from the standpoint of easiness of handling, sparingly soluble inorganic salts are preferred, and kaolin is more preferred.

A surfactant can be further added to the dispersing medium, too. Examples of the surfactant include a sodium alkylbenzenesulfonate, sodium laurylsulfate, a sodium polyoxyethylene alkyl ether phosphate, and a sodium polyoxyethylene alkyl ether sulfate, and besides, anionic surfactants, nonionic surfactants, and the like which are generally used for suspension polymerization.

<Step (C)>

In the step (C), the crosslinked multi-layered resin particles can be, for example, obtained by heating to a temperature (crosslinking temperature) equal to or higher than the temperature at which the base polymer that constitutes the core layer is softened, and the crosslinking agent is substantially decomposed, and holding for a predetermined time (crosslinking-holding time), thereby crosslinking the multilayered resin particles containing TPE.

The crosslinking temperature is preferably equal to or higher than a melting point of the base polymer that constitutes the multi-layered resin particles and (melting point+ 80° C.) or lower, and specifically, it is preferably 100° C. to 170° C. The time of holding at the crosslinking temperature (crosslinking-holding time) is preferably 1 minute or more, and more preferably 20 minutes or more, and preferably 100 minutes or less, and more preferably 60 minutes or less.

A xylene insoluble content of the crosslinked multi-layered resin particles obtained through the step (C) by the hot xylene extraction method is preferably 30 to 70% by mass. The xylene insoluble content of the crosslinked multi-layered resin particles by the hot xylene extraction method is measured by the same method as that for the xylene insoluble content of the expanded beads by the not xylene extraction method as mentioned later.

<Step (D)>

In the step (D), the expandable multi-layered resin particles or expandable crosslinked multi-layered resin particles can be, for example, obtained by impregnating the multi-layered resin particles or crosslinked multi-layered resin particles with a blowing agent by holding at a predetermined temperature (impregnation temperature) for a predetermined time (impregnation-holding time).

The blowing agent is not particularly limited so long as it is able to expand the multi-layered resin particles. Examples of the blowing agent include inorganic physical blowing agents, such as air, nitrogen, carbon dioxide, argon, helium, oxygen, and neon; and organic physical blowing agents, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether. e.g., dimethyl ether, diethyl ether, and methyl ethyl ether. Of these, inorganic physical blowing agents which are not only free from fracture of an ozone layer but also inexpensive are preferred, nitrogen, air, and carbon dioxide are more preferred, and carbon dioxide is especially preferred. These are used alone or in combination of two or more thereof.

Although a blending amount of the blowing agent is determined taking into consideration the desired apparent density of the expanded beads, the kind of the base polymer, the kind of the blowing agent, etc., in general, it is preferred to use the organic physical blowing agent in an amount of 5 to 50 parts by mass and the inorganic physical blowing agent in an amount of 0.5 to 30 parts by mass, respectively based on 100 parts by mass of the multi-layered resin particles or crosslinked multi-layered resin particles.

The impregnation temperature is preferably equal to or higher than a melting point of the base polymer and (melting point+80° C.) or lower, and specifically, it is preferably 100° C. to 170° C. The time of holding at the impregnation temperature (impregnation-holding time) is preferably 1 minute or more, and more preferably 20 minutes or more, and preferably 100 minutes or less, and more preferably 60 minutes or less.

The step (D) may be performed prior to the step (C) or simultaneously with the step (C). In the case of performing the step (D) prior to the step (C), expandable multi-layered resin particles can be obtained by impregnating the multi-layered resin particles with the blowing agent. On the other hand, in the case of performing the step (D) simultaneously with the step (C), expandable crosslinked multi-layered resin particles can be obtained by impregnating the multi-layered resin particles or crosslinked multi-layered resin particles with the blowing agent.

<Step (E)>

In the step (E), the expanded beads can be, for example, produced by releasing heated expandable crosslinked multi-layered resin particles, which are impregnated with the blowing agent through the step (D), from the inside of the closed vessel into an atmosphere under a pressure lower than a pressure within the closed vessel, thereby expanding the resin particles.

Specifically, the expanded beads can be produced by while holding the pressure within the closed vessel at a pressure equal to or higher than a vapor pressure of the blowing agent, opening one end under the liquid face within the closed vessel and releasing the expandable crosslinked multi-layered resin particles impregnated with the blowing agent together with a dispersing medium into an atmosphere under a pressure lower than a pressure within the closed vessel from the inside of the closed vessel, typically under atmospheric pressure, thereby expanding the expandable crosslinked multi-layered resin particles. In addition, the expanded beads can also be produced by after cooling and taking out the expandable crosslinked multi-layered resin particles obtained through the step (D), heating for foaming the expandable crosslinked multi-layered resin particles with a heating medium, such as warm air and steam.

In the step (E), the temperature at the time of expansion (expansion temperature) may not be identical with the crosslinking temperature, and typically, it is preferably 110° C. to 170° C. In addition, the pressure within the closed vessel (pressure in kettle) is preferably a vapor pressure or higher and 5 MPa or lower.

Although it is preferred to perform the steps (B) to (E) as one sequence in a single closed vessel, after each of the steps, the multi-layered resin particles and so on are taken out in every step and again put into the closed vessel, whereby the treatment of the separate step, such as the subsequent step, can be performed, too.

In particular, in obtaining expanded beads having a low apparent density, the expanded beads are subjected to aging that is typically performed under atmospheric pressure; the resulting expanded beads are then put into a pressurizable closed vessel and subjected to a pressurizing treatment by injecting a pressurized gas of air or the like into the vessel to increase an internal pressure of the expanded beads; and the expanded beads are heated with a heating medium, such as hot air, within the vessel for a predetermined time, whereby expanded beads having a lower apparent density (second-stage expanded beads) can be obtained.

[Physical Properties, Etc. Of Expanded Thermoplastic Elastomer Beads]

(Shape of Expanded Beads)

The expanded beads have a cylindrical shape that is generally corresponding to the shape of the multi-layered resin particles. The expanded beads may have a circular cylindrical shape, an elliptical cylindrical shape, a triangular cylindrical shape, a quadrangular cylindrical shape, a pentagonal or more polygonal cylindrical shape, a cylindrical shape having a shape with plural protrusions, for example, a star shape, as the cross-sectional shape orthogonal to a punching direction, a cylindrical shape having an indeterminate shape as the cross-sectional shape orthogonal to a punching direction, or the like. Of these, the multi-layered resin particles preferably have a circular cylindrical shape from the viewpoint of filling properties of the expanded beads.

(Aspect Ratio of Expanded Beads)

An average aspect ratio of the expanded beads of the present invention is preferably 1.0 to 1.5. When the aspect ratio of the expanded beads falls within the aforementioned range, not only the expanded beads are more excellent in filling properties, but also the voidage of the expanded beads molded article is more easily controlled. From the aforementioned viewpoint, the aspect ratio of the expanded beads is more preferably 1.0 to 1.4, and still more preferably 1.0 to 1.3.

The average aspect ratio of the expanded beads is a value obtained by measuring 100 randomly selected expanded beads for a maximum length (1) and a cross-sectional maximum diameter (d) in the cross section of the bead in a direction orthogonal to the longitudinal direction of the maximum length by using a caliper, etc., and calculating a ratio (1/d), and arithmetically averaging the calculated values.

(Angle of Repose of Expanded Beads)

From the viewpoint of filling properties of the expanded beads and control of the voidage of the expanded beads molded article, an angle of repose of the expanded beads is preferably 45° or less, and more preferably 43° or less. A lower limit of the angle of repose is generally 35°.

The angle of repose of the expanded beads can be measured with a repose angle measuring device by cylinder rotation method "Flow Surface Angle Measuring Instrument FSA-100S", available from Tsutsui Scientific Instruments Co., Ltd., etc.

(Through-Holes of Expanded Beads)

The shape of the through-hole which the expanded thermoplastic elastomer beads have is not particularly limited, and it typically has a circular shape as the cross-sectional shape orthogonal to a punching direction. The through-hole may have an elliptical shape, a quadrate shape, a rectangular shape, a trapezoidal shape, a triangular shape, a pentagonal or more polygonal shape, a shape with plural protrusions, for example, a star shape, an indeterminate shape, or the like.

From the viewpoint of recoverability within a short time of the expanded beads molded article obtained by subjecting the expanded beads molded article to in-mold molding, an inside diameter of the through-hole of the expanded bead (major axis of the aforementioned cross-sectional shape) is preferably 0.8 mm or more, more preferably 1.0 mm or more, and still more preferably 1.5 mm or more, and preferably 7.0 mm or less, more preferably 5.0 mm or less, and still more preferably 3.0 mm or less.

From the viewpoint of filling properties, a length in the punching direction of the through-hole which the expanded beads have is preferably 1 mm or more, and preferably 10 mm or less, and more preferably 7 mm or less.

(Apparent Density of Expanded Beads)

An apparent density of the expanded thermoplastic elastomer beads is preferably 10 kg/m$^3$ or more and 250 kg/m$^3$ or less, more preferably 30 kg/m$^3$ or more and 200 kg/m$^3$ or less, still more preferably 35 kg/m$^3$ or more and 150 kg/m$^3$ or less, yet still more preferably 40 kg/m$^3$ or more and 100 kg/m$^3$ or less, and even yet still more preferably 45 kg/m$^3$ or more and 90 kg/m$^3$ or less. When the apparent density of the expanded beads falls within the aforementioned range, an expanded beads molded article which is more excellent in lightness in weight, flexibility, resilience, recoverability, etc. can be molded. According to the expanded beads of the present invention, it is possible to mold an expanded beads molded article which has a high voidage and is uniform even in the case where the apparent density is small.

The apparent density of the expanded beads is determined as follows. First of all, a group of expanded beads is allowed to stand under conditions of a relative humidity of 50% at 23° C. and 1 atm for 2 days. Subsequently, a graduated measuring cylinder having water at 23° C. charged therein is prepared, and the group of expanded beads in an arbitrary amount (mass of the group of expanded beads: W1) is sunk in water within the graduated measuring cylinder by using a tool, such as a wire net. Then, taking into consideration the volume of the tool, such as a wire net, a volume V1 [L] of the group of expanded beads, which is read from a rise of the water level volume, is measured. The apparent density [kg/m$^3$] of the expanded beads is determined by dividing the mass W1 [g] of the group of expanded beads charged in the graduated measuring cylinder by the volume V1 [L] to undergo unit conversion (W1/V1).

(Bulk Density of Expanded Beads)

A bulk density of the expanded thermoplastic elastomer beads is preferably 10 kg/m$^3$ or more, more preferably 15 kg/m$^3$ or more, and still more preferably 20 kg/m$^3$ or more, and preferably 250 kg/m$^3$ or less, more preferably 200 kg/m$^3$ or less, still more preferably 150 kg/m$^3$ or less, and yet still more preferably 100 kg/m$^3$ or less. When the bulk density of the expanded beads falls within the aforementioned range, an expanded beads molded article which is more excellent in lightness in weight, flexibility, resilience, recoverability, etc. can be molded.

The bulk density of the expanded beads is determined as follows. The expanded beads are randomly taken out from the group of expanded beads and charged in a graduated measuring cylinder having a capacity of 1 L; a large number of expanded beads are accommodated to an extent of a scale of 1 L such that they become in a naturally accumulated state; and the bulk density of the expanded beads is calculated from a mass W2 [g] and an accommodated volume (1 [L]) of the accommodated expanded beads.

(Ratio of Apparent Density to Bulk Density of Expanded Beads)

A ratio of the apparent density to the bulk density of the expanded thermoplastic elastomer beads [(apparent density)/(bulk density)] is preferably 2.5 or less. When the foregoing ratio [(apparent density)/(bulk density)] falls within the aforementioned range, the filling properties of the expanded beads become more favorable, and even in the case of molding an expanded beads molded article having a high voidage, the moldability is more excellent. From the aforementioned viewpoint, the foregoing ratio [(apparent density)/(bulk density)] is more preferably 2.0 or less, and still more preferably 1.9 or less. A lower limit value thereof is generally 1.7. The smaller the ratio [(apparent density)/(bulk density)], the more excellent the filling properties of the expanded beads.

(Xylene Insoluble Content of Expanded Beads)

A xylene insoluble content of the expanded thermoplastic elastomer beads by the hot xylene extraction method is preferably 30% by mass or more and 70% by mass or less, and more preferably 40% by mass or more and 60% by mass or less. When the xylene insoluble content of the expanded beads falls within the aforementioned range, an expanded beads molded article which is more excellent in recoverability, durability, etc. can be molded, and even in the case where the density of the molded article is small, the voidage is readily maintained high. The xylene insoluble content by the hot xylene extraction method is one of indices expressing the crosslinked state of the expanded beads.

The xylene insoluble content by the hot xylene extraction method is determined as follows. About 1 g of a sample is weighed (the weighed mass of the sample is defined as G1 [g]) and boiled in 100 g of xylene for 6 hours; the resulting sample is then quickly filtered through a 100-mesh wire net; subsequently, the boiling xylene insolubles remaining on the wire mesh are dried for 8 hours using a vacuum dryer at 80° C.; the mass of the xylene insolubles is weighed (the weighed mass of the boiling xylene insolubles is defined as G2 [g]); and the hot xylene insoluble content is determined according to the following equation (1).

$$\text{Xylene insoluble content (\% by mass)}=[G2/G1]\times 100 \qquad (1)$$

(Average Cell Diameter of Expanded Beads)

An average cell diameter of the expanded thermoplastic elastomer beads is preferably 20 μm or more, more preferably 40 μm or more, still more preferably 60 μm or more, and yet still more preferably 80 μm or more, and preferably 200 μm or less, more preferably 180 μm or less, still more preferably 160 μm or less, and yet still more preferably 140 μm or less. When the average cell diameter of the expanded beads falls within the aforementioned range, not only the in-mold moldability of the expanded beads is more excellent, but also the physical properties of the expanded beads molded article are more excellent.

The average cell diameter of the expanded beads is measured in conformity with ASTM D3576-77 as follows. Fifty or more expanded beads are randomly selected from the group of expanded beads. The expanded beads are each cut so as to pass through a center portion thereof and divided into two, and an enlarged photograph of the cross section thereof is taken. In each of the cross-sectional photographs, four angularly equally spaced apart (45 degrees) line segments are drawn from an outermost surface of the expanded bead to the opposite outermost surface thereof so as to pass through the center portion of the expanded bead. The number of cells that intersect each line segment is counted. A total length of the four line segments is divided by a total number of the counts of the cells that intersect each line segment, to obtain an average chord length of the cells, which is then divided by 0.616 to determine an average cell diameter of each expanded bead, and these values are arithmetically averaged. The thus obtained value is defined as the average cell diameter of the expanded beads.

(Outer Layer Thickness (Ds) of Expanded Beads)

An outer layer thickness (Ds) that is a distance in the thickness direction from the surface of the expanded bead to a cell structure part having a cell structure is preferably 1.5 μm or more and 10 μm or less. When the outer layer thickness of the expanded beads falls within the aforementioned range, the secondary expansion of the expanded beads at the time of in-mold molding can be more effectively inhibited. From the aforementioned viewpoint, the outer layer thickness (Ds) of the expanded beads is more preferably 1.8 μm or more and 8.0 μm or less, and still more preferably 2.0 μm or more and 6.0 μm or less.

The outer layer thickness of the expanded beads can be measured as follows. An enlarged photograph of a cross section in which an arbitrary expanded bead is bisected approximately vertically in the punching direction is taken; in an arbitrary place on the enlarged photograph, a straight line is drawn from an arbitrary point of the surface (outer surface) of the expanded bead toward the center of the expanded bead (center of the through-hole); and on the straight line, a distance from the outer surface of the expanded bead to the cell structure part having a cell structure is then measured. The aforementioned measurement is performed on ten arbitrary points of the outer surface of the expanded bead, and the measured values are arithmetically averaged. This operation is performed with respect to 30 or more arbitrary expanded beads, and an arithmetic average value is defined as the outer layer thickness.

(Ratio [(Ds)/(Dc)])

A ratio [(Ds)/(Dc)] of an outer layer thickness (Ds) that is a distance in the thickness direction from the surface of the expanded bead to the cell structure part having a cell structure to an inner layer thickness (Dc) that is a distance in the thickness direction from the inner surface of the expanded bead on the through-hole side to the cell structure part is preferably 1.5 or more. When the ratio [(Ds)/(Dc)] falls within the aforementioned range, the secondary expansion of the expanded beads at the time of in-mold molding can be more effectively inhibited. In addition, in accordance with the present invention, even in the second-stage expanded beads resulting from second-stage expansion of the expanded beads, the aforementioned ratio [(Ds)/(Dc)] can be 1.8 or more. From the aforementioned viewpoint, the ratio [(Ds)/(Dc)] is more preferably 2.0 or more, and still more preferably 2.5 or more. An upper limit value thereof is generally 10.

The inner layer thickness (Dc) of the expanded beads can be measured as follows. An enlarged photograph of a cross section in which an arbitrary expanded bead is bisected approximately vertically in the punching direction is taken; in an arbitrary place on the enlarged photograph, a straight line is drawn from an arbitrary point of the inner surface of the expanded bead on the through-hole side toward the outer surface of the expanded bead; and on the straight line, a distance from the inner surface of the expanded bead on the through-hole side to the cell structure part having a cell structure is then measured. The aforementioned measurement is performed on ten arbitrary points of the inner surface of the expanded bead, and the measured values are arithmetically averaged. This operation is performed with respect to 30 or more arbitrary expanded beads, and an arithmetic average value is defined as the inner layer thickness.

[Expanded Thermoplastic Elastomer Beads Molded Article]

The expanded thermoplastic elastomer beads molded article of the present invention (hereinafter also referred to simply as "expanded thermoplastic elastomer beads molded article", "expanded beads molded article", or "molded article") is an expanded thermoplastic elastomer beads molded article formed by subjecting expanded cylindrical thermoplastic elastomer beads (hereinafter also referred to simply as "expanded thermoplastic elastomer beads" or "expanded beads") provided with through-holes to in-mold molding, the expanded thermoplastic elastomer beads including a core layer constituted of a base polymer containing a thermoplastic elastomer and a cover layer covering the core layer and containing a thermoplastic polymer, wherein a voidage is 15% or more, a density is 10 kg/m$^3$ or more and 200 kg/m$^3$ or less, and the product of a tensile strength (MPa) and a tensile elongation (%) is 5 or more.

[Production Method of Expanded Thermoplastic Elastomer Beads Molded Article]

The expanded thermoplastic elastomer beads molded article of the present invention can be, for example, produced by subjecting the already-mentioned expanded beads to in-mold molding by a conventionally known method.

Specifically, after filling the expanded beads within a molding mold, by introducing a heating medium, such as steam, into the molding mold, to heat and expand the expanded beads, and the expanded beads are fusion bonded to each other, whereby an expanded beads molded article having a shape of a molding cavity shaped therein can be obtained.

As for the in-mold molding in the present invention, it is preferred to perform molding by a pressuring molding method, in which the expanded beads are subjected to a pressurizing treatment with a pressurizing gas, such as air, in advance to increase the pressure within the expanded beads; the pressure within the expanded beads is regulated to 0.01 to 0.3 MPa(G) (G means a gauge pressure); the expanded beads are filled within a molding mold cavity under atmospheric pressure or reduced pressure; and after closing the mold, a heating medium, such as steam, is supplied into the mold, thereby fusion bonding the expanded beads to each other (for example, the method described in JP S51-22951 B). In addition, the molding can be performed by a compression filling molding method, in which in a cavity having been pressurized to a pressure equal to or higher than the atmospheric pressure with a compressed gas, the expanded beads having been pressurized to a pressure equal to or higher than the foregoing pressure are filled, and a heating medium, such as steam, is then supplied into the cavity, thereby fusion bonding the expanded beads to each other (for example, the method described in JP H4-46217 B). Besides, the molding can be performed by an atmospheric filling molding method, in which the expanded beads having a high secondary expansion force to be obtained under a special condition are filled within a molding mold cavity of a pair of female and male molds under atmospheric pressure or reduced pressure, and a heating medium, such as steam, is then supplied for heating, thereby fusion bonding the expanded beads to each other (for example, the method described in JP H6-49795 B), or a method combining the aforementioned methods (for example, the method described in JP H6-22919 B).

In particular, in obtaining an expanded beads molded article having a low apparent density, second-stage expansion may be performed such that the expanded beads are subjected to aging that is typically performed under atmospheric pressure prior to performing in-mold molding; the resulting expanded beads are then put into a pressurizable closed vessel and subjected to a pressuring treatment by injecting a pressurized gas, such as air, into the vessel to increase an internal pressure of the expanded beads; and the expanded beads are heated with a heating medium, such as hot air, within the vessel for a predetermined time.

[Physical Properties, Etc. Of Expanded Thermoplastic Elastomer Beads Molded Article]

(Density of Expanded Beads Molded Article)

A density of expanded thermoplastic elastomer beads molded article is 10 kg/m$^3$ or more and 200 kg/m$^3$ or less, preferably 20 kg/m$^3$ or more and 180 kg/m$^3$ or less, more preferably 30 kg/m$^3$ or more and 160 kg/m$^3$ or less, and still more preferably 35 kg/m$^3$ or more and 150 kg/m$^3$ or less. When the density of the expanded beads molded article falls within the aforementioned range, the strength of cell films is kept, and the expanded beads molded article is easy to resist the compression and excellent in recoverability after compression.

Three test pieces are randomly cut out in a size of 50 mm (length)×50 mm (width)×25 mm (thickness) from the expanded beads molded article such that each of the test pieces becomes in a rectangular parallelepiped form exclusive of a skin layer at the time of molding; the mass and volume of each of the test pieces are measured; and the apparent density of the three test pieces is calculated, whereby the density of the expanded beads molded article is determined as an arithmetic average value thereof.

(Shrinkage Rate of Expanded Beads Molded Article)

A shrinkage rate of the expanded thermoplastic elastomer beads molded article is preferably 15% or less, more preferably 12% or less, and still more preferably 10% or less. It is expressed that as the shrinkage rate of the expanded beads molded article is smaller, the expanded beads molded article is small in the voidage between the expanded beads and excellent in the surface appearance.

The shrinkage rate of the expanded beads molded article is determined as follows. The expanded beads molded article is dried in an oven at 60° C. for 12 hours and then cooled to room temperature; the thus aged expanded beads molded article is measured for its dimension in the longitudinal direction; and the shrinkage rate is determined as a ratio of a difference between the dimension in the longitudinal direction of the molding mold and the dimension in the longitudinal direction of the expanded beads molded article relative to the dimension in the longitudinal direction of the molding mold.

(Rate of Dimensional Change Upon Heating at 80° C. of Expanded Beads Molded Article)

A rate of dimensional change upon heating at 80° C. of the expanded beads molded article is preferably −5 to 5%, more preferably −4 to 3%, and still more preferably −3 to 1%. When the rate of dimensional change upon heating falls within the aforementioned range, the expanded beads molded article has a small dimensional change in a high temperature atmosphere and has excellent heat resistance.

The rate of dimensional change rate upon heating is measured in conformity with the B method of JIS K6767: 1999. Specifically, from the expanded beads molded article, a molded article having a size of 150 mm×150 mm is cut out while unchanging the thickness as it is; on a central portion of the molded article, three straight lines which are parallel with each other and arranged at intervals of 50 mm are drawn in each of the longitudinal and transverse directions of the molded article; the three straight lines in each of the longitudinal and transverse directions are measured for their lengths, and an average value thereof is calculated to obtain an initial length; thereafter, the molded article is allowed to stand at 80° C. for 22 hours, taken out, and then allowed to stand under conditions at 23° C. for 1 hour; and the molded article after standing for 1 hour is subjected to the same measurement as that for the initial dimension, to obtain a dimension, and the rate of dimensional change upon heating is calculated from a ratio in dimensional change before and after heating.

(Voidage of Expanded Beads Molded Article)

A voidage of the expanded thermoplastic elastomer beads molded article is 15% or more, preferably 17% or more, and more preferably 19% or more. When the voidage of the expanded beads molded article falls within the aforementioned range, the expanded beads molded article is excellent in lightness in weight, flexibility, recoverability, repulsion elasticity, etc. In accordance with the present invention, even in an expanded beads molded article having a low density, the voidage can be maintained high.

The voidage of the expanded beads molded article is measured as follows. A test piece in a cubic shape, which is cut out from the expanded beads molded article, is sunk in a graduated measuring cylinder having ethanol charged therein, and a true volume Vc (L) of the test piece is determined from the rise of the liquid level of ethanol. In addition, an apparent volume Vd (L) is determined from the outside dimensions (length×width×height) of the test piece. The voidage of the expanded beads molded article is determined from the determined true volume Vc and the apparent volume Vd on a basis of the following equation (2).

$$\text{Voidage (\%)} = [(Vd-Vc)/Vd] \times 100 \qquad (2)$$

(Coefficient of Variation of Density of Expanded Beads Molded Article)

A coefficient of variation of density (C.V) of the expanded thermoplastic elastomer beads molded article is preferably 0.005 to 0.020, more preferably 0.005 to 0.018, and still more preferably 0.005 to 0.015. It is expressed that as the coefficient of variation of density of the expanded beads molded article is smaller, the voids in the expanded beads molded article are less varied and uniform.

The coefficient of variation of density of the expanded beads molded article is determined by dividing a standard deviation of the density of the expanded beads molded article by an average density of the expanded beads molded article. The value of the standard deviation is a value given by a square root of unbiased variance.

(Compression Set of Expanded Beads Molded Article)

As for the expanded beads molded article of the present invention, a compression set measured by compressing the molded article at 23° C. for 22 hours while being compressed by 25% and then releasing under atmospheric pressure at a temperature of 23° C., followed by lapsing 24 hours is preferably 5% or less, more preferably 3% or less, and still more preferably 2% or less. Not only the expanded beads molded article of the present invention has voids, so that it is excellent in recoverability from the compressed state, but also in view of the fact the cell film is formed of the elastomer, the voids are readily recovered, and even in the case where the cells are collapsed, the recoverability is favorable, so that the expanded beads molded article is excellent in recoverability.

(Tensile Properties of Expanded Beads Molded Article)

As for the expanded thermoplastic elastomer beads molded article, the product of a tensile strength (A) [MPa] and a tensile elongation (B) [%] is 5 or more, preferably 7 or more, and more preferably 9 or more, and preferably 50 or less, and more preferably 30 or less. The expanded beads molded article of the present invention is excellent in a balance between the strength and the flexibility because the product [(A)×(B)] of the tensile strength (A) and the tensile elongation (B) of the expanded beads molded article falls within the aforementioned range. In addition, even in the case where the expanded beads molded article of the present invention has a low density and a high voidage, it satisfies the aforementioned range of the product [(A)×(B)]. This may be considered to be caused due to the fact that the expanded beads molded article of the present invention includes a core layer constituted of a base polymer containing a thermoplastic elastomer and a thermoplastic polymer cover layer covering the core layer and has excellent fusion bonding properties. In this specification, the aforementioned value of the product [(A)×(B)] is sometimes used as an index for durability of the expanded beads molded article.

The tensile strength and the tensile elongation of the expanded beads molded article are determined by a method in conformity with JIS K6767:1999, in which a cut piece having a size of 120 mm×25 mm×10 mm is cut out from the expanded beads molded article using a vertical slicer so that all surfaces thereof are cut surfaces; a test piece having a dumbbell No. 1 shape is produced from the cut piece using a fret saw; and the test piece is subjected to a tensile test at a tensile speed of 500 mm/min. A maximum tensile stress measured at the time of tension and an elongation at break are defined as the tensile strength and the tensile elongation, respectively.

The expanded beads molded article of the present invention is suitable for applications, such as building materials, automobile members, vibration insulating materials, cushioning materials, sports pad materials, shoe sole materials, and toys. The expanded beads molded article of the present invention is one having a high voidage and a suppressed variation thereof, and therefore, for example, in the case of being used as a cushioning material, it is free from a sense of discomfort, etc. when seated and more excellent in comfort to sit on.

EXAMPLES

Next, the present invention is described in more detail by reference to Examples, but it should be construed that the present invention is by no means limited by these Examples.
<Raw Materials>

Raw materials used for production of expanded beads of Examples and Comparative Examples are shown in Table 1. In Table 1, the base polymer containing a thermoplastic elastomer constituting a core layer is expressed as "Base Polymer", and the thermoplastic polymer constituting a cover layer is expressed as "Polymer". Base Polymer 2 is a mixture in which TPO and high density polyethylene (HDPE) were mixed in a ratio of 80% by mass:20% by mass.

TABLE 1

|  |  |  | Melting point Tm (° C.) | MFR (g/ 10 min) | Flexural modulus (MPa) |
|---|---|---|---|---|---|
| Base Polymer 1 | TPO | INFUSE 9530 | 120 | 5 | 28 |
| Base Polymer 2 | TPO: 80% by mass | INFUSE 9530 | 120 | 5 | 28 |
|  | HDPE: 20% by mass | NIPOLON HARD 1200 | 132 | 21 | 820 |

TABLE 1-continued

|  |  |  | Melting point Tm (° C.) | MFR (g/ 10 min) | Flexural modulus (MPa) |
|---|---|---|---|---|---|
|  | (Physical property value of polyethylene-based resin) − (Physical property value of TPO) Mixture |  | 12 125 | 16 8 | — 53 |
| Polymer 1 | HDPE | NIPOLON HARD 2300 | 132 | 7 | 870 |
| Polymer 2 | LLDPE | ULTZEX 4570 | 127 | 7 | 660 |
| Polymer 3 | LDPE | NOVATEC LD LF640MA | 113 | 5 | 160 |
| Polymer 4 | m-LLDPE | KERNEL KC570S | 102 | 10 | 110 |

<Physical Properties of Raw Material>

The melting point, melt flow rate (MFR), flexural modulus, Vicat softening temperature, and coefficient of dynamic friction of each of the raw materials used for production of expanded beads of the Examples and Comparative Examples were measured as follows.
(Melting Point Tm of Raw Material)

The melting point (Tmc) of the base polymer and the melting point (Tms) of the thermoplastic polymer each mean a melting peak temperature measured on the basis of heat flux differential scanning calorimetry as described in JIS K7121:2012. As for conditioning of the test piece, "(2) When measuring the melting temperature after performing a determined heat treatment" was adopted, and a heating rate and a cooling rate adopted were both 10° C./min. In the case where a plurality of melting peaks appeared on the DSC curve, the melting point was a peak top temperature of the melting peak having a largest area. In the case where the raw material contained additives and the like, the melting point obtained by using the raw material containing the additives and the like as a test piece and performing the aforementioned measurement was defined as the melting point of the raw material.
(MFR of Raw Material)

The MFR of each of the base polymer and the thermoplastic polymer was determined by performing the measurement under conditions of a temperature of 190° C. and a load of 2.16 kg in conformity with JIS K7210-1:2014. In the case where the raw material contained additives and the like, by using the raw material containing additives and the like as the test piece, the MFR obtained by performing the aforementioned measurement was defined as MFR of the raw material.
(Flexural Modulus of Raw Material)

The flexural modulus of each of the base polymer and the thermoplastic polymer was measured in conformity with JIS K7171:2016. Specifically, the raw material was heat pressed using a pressing machine heated at 200° C., to produce a test piece of 80 mm (length)×10 mm (width)×4 mm (thickness), which was then subjected to three-point bending using a load cell of 10 kg and under conditions at an inter-fulcrum distance of 64 mm and a bending rate of 2 mm/min. The flexural modulus was calculated from a gradient of a displacement between 0.5 and 1.0 mm.
(Vicat Softening Temperature of Raw Material)

The Vicat softening temperature of each of the base polymer and the thermoplastic polymer was determined by performing the measurement of a test piece of 20 mm (length)×20 mm (width)×3.5 mm (thickness), which had been produced using a pressing machine heated at 200° C., with a HDT/VICAT softening point tester "TM4123", available from Ueshima Seisakusho Co., Ltd. in conformity with ISO 306:2013/A50. The Vicat softening temperature was measured by using a virgin raw material in a non-crosslinked state and a crosslinked raw material obtained by crosslinking the virgin raw material with a crosslinking agent, respectively.

The test piece of the crosslinked raw material was produced as follows. The virgin raw material was first fed together with zinc borate as a cell nucleating agent into an extruder, crosslinked under the same conditions as the crosslinking conditions of the expanded beads described in Tables 2 and 3, and then expanded under the same conditions as those for the expanded beads described in Tables 2 and 3, thereby obtaining crosslinked expanded beads. The obtained crosslinked expanded beads were heat pressed using a pressing machine heated at 200° C., to obtain a test piece of the crosslinked raw material of 20 mm (length)×20 mm (width)×3.5 mm (thickness).

(Coefficient of Dynamic Friction of Raw Material)

The coefficient of dynamic friction of each of the base polymer and the thermoplastic polymer was measured in conformity with "Plastics—Film and sheeting—Determination of coefficients of friction" described in JIS K7125:1999. The raw material was heat pressed using a pressing machine heated at 200° C., to produce a test piece of 63 mm (length)×63 mm (width)×4 mm (thickness). The measurement was performed by using a sliding piece having a total mass of 200 g; not sheathing the bottom surface of the sliding piece by another material; using a coated steel panel (available from Nisshin Steel Co., Ltd., a trade name: Moonstar GL Color SELiOS/GL Enamel Clean/Stroke Ream, thickness: 0.27 mm) as a test table; not using a spring; and adopting a testing speed of 500 mm/min and a testing distance of 80 mm. Then, a value obtained by ignoring a first maximum load and dividing an average value (N) of a friction force until 6 cm after detecting a relative shear movement at the contact interface by a normal force of 1.95 (N) was defined as the coefficient of dynamic friction. In the case where the raw material contained additives and the like, a coefficient of dynamic friction obtained by performing the aforementioned measurement using the raw material containing additives and the like as the test piece was defined as the coefficient of dynamic friction of the raw material.

(Inside Diameter of Through-Holes of Multi-Layered Resin Particles)

As for the inside diameter of the through-holes of the multi-layered resin particles, a cross-sectional photograph of the multi-layered resin particles was taken, and an inside diameter (diameter) of the through-holes in the cross-sectional photograph was measured.

<Physical Properties of Expanded Beads>

The apparent density, bulk density, voidage, xylene insoluble content, average cell diameter, outer layer thickness, inner layer thickness, angle of repose, and inside diameter of through-holes of the expanded beads or second-stage expanded beads of the Examples and Comparative Examples were measured as follows.

(Apparent Density of Expanded Beads)

The apparent density of the expanded beads was determined as follows. First of all, a group of expanded beads was allowed to stand under conditions of a relative humidity of 50% at 23° C. and 1 atm for 2 days. Subsequently, a graduated measuring cylinder having water at 23° C. charged therein was prepared, and the group of expanded beads in an arbitrary amount (mass of the group of expanded beads: W1) was sunk in water within the graduated measuring cylinder by using a tool, such as a wire net. Then, taking into consideration the volume of the tool, such as a wire net, a volume V1 [L] of the group of expanded beads, which was read from a rise of the water level volume, was measured. The apparent density [kg/m$^3$] of the expanded beads was determined by dividing the mass W1 [g] of the group of expanded beads charged in the graduated measuring cylinder by the volume V1 [L] to undergo unit conversion (W1/V1).

(Bulk Density of Expanded Beads)

The expanded beads were randomly taken out from the group of expanded beads and charged in a graduated measuring cylinder having a capacity of 1 L; a large number of expanded beads were accommodated to an extent of a scale of 1 L such that they became in a naturally accumulated state; and the bulk density of the expanded beads was calculated from a mass W2 [g] and an accommodated volume (1 [L]) of the accommodated expanded beads.

(Voidage of Expanded Beads)

An apparent volume A (cm$^3$) expressed by a scale of a graduated measuring cylinder when the expanded beads were charged in the graduated measuring cylinder, and a true volume B (cm$^3$) expressed by a scale of the graduated measuring cylinder corresponding to an increase when the expanded beads of this amount were sunk in the graduated measuring cylinder having an alcohol charged therein were determined, and the voidage (%) was determined from a relation: (%)=[(A−B)/A]×100.

(Xylene Insoluble Content of Expanded Beads)

The xylene insoluble content of the expanded beads by the hot xylene extraction method was determined as follows. About 1 g of a sample was weighed (the weighed mass of the sample was defined as G1 [g]) and boiled in 100 g of xylene for 6 hours; the resultant was then quickly filtered through a 100-mesh wire net; subsequently, the boiling xylene insolubles remaining on the wire mesh were dried for 8 hours using a vacuum dryer at 80° C.; the mass of the xylene insolubles was weighed (the weighed mass of the boiling xylene insolubles was defined as G2 [g]); and the hot xylene insoluble content was determined according to the following equation (1).

$$\text{Xylene insoluble content (\% by mass)} = [G2/G1] \times 100 \quad (1)$$

(Average Cell Diameter of Expanded Beads)

The average cell diameter of the expanded beads was measured in conformity with ASTM D3576-77 as follows. Fifty or more expanded beads were randomly selected from the group of expanded beads. The expanded beads were each cut so as to pass through a center portion thereof and divided into two, and an enlarged photograph of the cross section thereof was taken. In each of the cross-sectional photographs, four angularly equally spaced apart (45 degrees) line segments were drawn from an outermost surface of the expanded bead to the opposite outermost surface thereof so as to pass through the center portion of the expanded bead. The number of cells that intersected each line segment was counted. A total length of the four line segments was divided by a total number of the counts of the cells that intersected each line segment to obtain an average chord length of the cells, which was then divided by 0.616 to determine an average cell diameter of each expanded bead, and these values were arithmetically averaged. The thus obtained value was defined as the average cell diameter of the expanded beads.

(Outer Layer Thickness of Expanded Beads)

The outer layer thickness of the expanded beads was determined as follows. First, an enlarged photograph of a cross section in which an arbitrary expanded bead was bisected approximately vertically in the punching direction was taken; in an arbitrary place on the enlarged photograph, a straight line was drawn from an arbitrary point of the surface (outer surface) of the expanded bead toward the center of the expanded bead (center of the through-hole); and on the straight line, a distance from the outer surface of the expanded bead to the cell structure part having a cell structure was then measured. The aforementioned measurement was performed on ten arbitrary points of the outer surface of the expanded bead, and the measured values were arithmetically averaged. This operation was performed with respect to 30 or more arbitrary expanded beads, and an arithmetic average value was defined as the outer layer thickness.

(Inner Layer Thickness of Expanded Beads)

The inner layer thickness of the expanded beads was determined as follows. An enlarged photograph of a cross section in which an arbitrary expanded bead was bisected approximately vertically in the punching direction was taken; in an arbitrary place on the enlarged photograph, a straight line was drawn from an arbitrary point of the inner surface of the expanded bead on the through-hole side toward the outer surface of the expanded bead; and on the straight line, a distance from the inner surface of the expanded bead on the through-hole side to the cell structure part having a cell structure was then measured. The aforementioned measurement was performed on ten arbitrary points of the inner surface of the expanded bead, and the measured values were arithmetically averaged. This operation was performed with respect to 30 or more arbitrary expanded beads, and an arithmetic average value was defined as the inner layer thickness.

(Angle of Repose of Expanded Beads)

The angle of repose of the expanded beads was measured with a repose angle measuring device by cylinder rotation method "Flow Surface Angle Measuring Instrument FSA-100S", available from Tsutsui Scientific Instruments Co., Ltd. The expanded beads were charged in a 200-mL exclusive glass container, the rotation rate was set at 26 seconds per round, and a tilt angle of the expanded beads at that time was defined as the angle of repose of the expanded beads.

(Inside Diameter of Through-holes of Expanded Beads)

As for the inside diameter of the through-holes of the expanded beads, a cross-sectional photograph of the expanded beads was taken, and an inside diameter (diameter) of the through-holes in the cross-sectional photograph was measured. This measurement was performed on ten expanded beads, and an arithmetic average value thereof was defined as the inside diameter of the through-holes of the expanded beads.

<Physical Properties of Expanded Beads Molded Article>

The density, shrinkage rate, voidage, coefficient of variation of density, tensile strength, and tensile elongation of each of the expanded beads molded articles of the Examples and Comparative Examples were measured as follows.

(Density of Expanded Beads Molded Article)

Three test pieces were randomly cut out in a size of 50 mm (length)×50 mm (width)×25 mm (thickness) from the expanded beads molded article such that each of the test pieces became in a rectangular parallelepiped form exclusive of a skin layer at the time of molding; the mass and volume of each of the test pieces were measured; and the apparent density of the three test pieces was calculated, whereby the density of the expanded beads molded article was determined as an arithmetic average value thereof.

(Shrinkage Rate of Expanded Beads Molded Article)

The expanded beads molded article was dried in an oven at 60° C. for 12 hours and then cooled to room temperature; the thus aged expanded beads molded article was measured for its dimension in the longitudinal direction; and the shrinkage rate was determined as a ratio of a difference between the dimension in the longitudinal direction of the molding mold and the dimension in the longitudinal direction of the expanded beads molded article relative to the dimension in the longitudinal direction of the molding mold.

(Rate of Dimensional Change Upon Heating at 80° C.)

The rate of dimensional change of the expanded beads molded article was measured in conformity with the B method of JIS K6767:1999. First, from the expanded beads molded article, a molded article having a size of 150 mm (length)×150 mm (width) was cut out while unchanging the thickness (50 mm) as it was; on a central portion of the molded article, three straight lines which were parallel with each other and arranged at intervals of 50 mm were drawn in each of the longitudinal and transverse directions of the molded article: the three straight lines in each of the longitudinal and transverse directions were measured for their lengths, and an average value thereof was calculated to obtain an initial length ($L_0$). Thereafter, the molded article was allowed to stand at 80° C. for 22 hours, taken out, and then allowed to stand under conditions at 23° C. for 1 hour. The molded article after standing for 1 hour was subjected to the same measurement as that for the initial dimension $L_0$, to obtain a dimension ($L_1$) after heating. A ratio of dimensional change before and after heating relative to the dimension before heating (($L_1-L_0$)/$L_0$×100) was defined as the rate of dimensional change upon heating at 80° C.

(Voidage of Expanded Beads Molded Article)

The voidage of the expanded beads molded article was measured as follows. A test piece in a cubic shape, which was cut out from the expanded beads molded article, was sunk in a graduated measuring cylinder having ethanol charged therein, and a true volume Vc (L) of the test piece was determined from the rise of the liquid level of ethanol. In addition, an apparent volume Vd (L) was determined from the outside dimensions (length×width×height) of the test piece. The voidage of the expanded beads molded article was determined from the determined true volume Vc and the apparent volume Vd on a basis of the following equation (2).

$$\text{Voidage (\%)}=[(Vd-Vc)/Vd]\times 100 \qquad (2)$$

(Coefficient of Variation of Density of Expanded Beads Molded Article)

The coefficient of variation of density of the expanded beads molded article was determined by dividing a standard deviation of the density of the expanded beads molded article by an average density of the expanded beads molded article. Nine test pieces were randomly cut out in a size of 60 mm (length)×60 mm (width)×50 mm (thickness) from the expanded beads molded article such that each of the test pieces became in a rectangular parallelepiped, and the mass and volume of each of the test pieces were determined. The value of the standard deviation is a value determined as a square root of unbiased variance.

(Compression Set of Expanded Beads Molded Article)

The compression set of the expanded beads molded article was measured at a temperature of 23° C. on the basis of JIS K6767:1999. Specifically, five test pieces were cut out in a size of 50 mm (length)×50 mm (width)×25 mm (thickness) from the expanded beads molded article such that each of the test pieces became in a rectangular parallelepiped form exclusive of a skin layer at the time of molding; the test pieces were allowed to stand in a state of being compressed with 25% in the thickness direction for 22 hours in an environment at a temperature of 23° C. and a relative humidity of 50%; and 24 hours after releasing the compression, the thickness was measured to determine the compression set (%) of each of the test pieces. An arithmetic average value thereof was defined as the compression set (%).

(Tensile Properties of Expanded Beads Molded Article)

The tensile strength and the tensile elongation of the expanded beads molded article were determined by a method in conformity with JIS K6767:1999, in which a cut piece having a size of 120 mm×25 mm×10 mm was cut out from the expanded beads molded article using a vertical slicer so that all surfaces thereof were cut surfaces; a test piece having a dumbbell No. 1 shape was produced from the cut piece using a fret saw; and the test piece was subjected to a tensile test at a tensile speed of 500 mm/min. A maximum tensile stress measured at the time of tension and an elongation at break were defined as the tensile strength and the tensile elongation, respectively.

Examples 1 to 4 and Comparative Examples 1 to 4

<Production of Expanded Beads>
(Production of Multi-layered Resin Particles)

An extruder provides with a core layer-forming extruder having an inside diameter of 26 mm; a cover layer-forming extruder having an inside diameter of 25 mm; and a multi-layered strand-forming die, which was installed on the outlet sides of these extruders, was used. A base polymer containing each of thermoplastic elastomers described in Tables 2 and 3 was fed into the core layer-forming extruder and melt kneaded to form a core layer-forming melt kneaded product; and each of thermoplastic polymers described in Tables 2 and 3 was fed into the cover layer-forming extruder and melt kneaded to form a cover layer-forming melt kneaded product. Subsequently, the core layer-forming melt kneaded product and the cover layer-forming melt kneaded product were introduced into the multi-layered strand-forming die and joined, the complex was extruded from a small orifice of a die attached to the tip of the extruder into a form of a cylindrical strand (core layer: 95% by mass, cover layer: 5% by mass) provided with through-holes, and after cooling with water, the resultant was cut with a pelletizer so as to have a mass of 2 mg and an aspect ratio (L/D) of 1 and dried, thereby obtaining multi-layered resin particles having an inside diameter described in each of Tables 2 and 3. In the thermoplastic elastomer resin composition constituting the core layer, zinc borate was added as a cell controlling agent such that the content thereof was 0.1 parts by mass based on 100 parts by mass of the multi-layered resin particles.

(Production of Expanded Beads)

A closed vessel having a capacity of 5 liters was charged with 3 liters of water as a dispersing medium, 700 g of the obtained multi-layered resin particles, 3 g of kaolin as a dispersant, 0.2 g of a sodium alkylbenzenesulfonate as a surfactant, and a trade name "TRIGONOX 117" (Tri117), available from DKS Co., Ltd. as a crosslinking agent; carbon dioxide as a blowing agent was injected at 1.5 MPa(G); and the temperature was raised with stirring under conditions described in each of Tables 2 and 3, to obtain expandable crosslinked multi-layered resin particles. Subsequently, after reaching the expansion temperature described in each of Tables 2 and 3, the resultant was held for 30 minutes. Thereafter, the closed vessel was opened while maintaining the pressure at a pressure in kettle described in each of Tables 2 and 3, to release the expandable crosslinked multi-layered resin particles together with the dispersing medium into an atmospheric pressure from the inside of the closed vessel, thereby obtaining expanded beads. The physical properties, etc. of the obtained expanded beads, etc. are shown in Tables 2 and 3.

(Production of Second-Stage Expanded Beads)

The obtained expanded beads were aged under an atmospheric pressure and then charged into a pressurizable closed vessel, followed by pressurization to an internal pressure described in each of Tables 2 and 3. The pressurized expanded beads were charged in another closed vessel and heated while stirring for 15 seconds at a steam pressure described in each of Tables 2 and 3, to obtain second-stage expanded second-stage expanded beads. The physical properties, etc. of the obtained second-stage expanded beads are shown in Tables 2 and 3, respectively.

<Production of Expanded Beads Molded Article>

The obtained expanded beads were filled in a mold in a flat plate shape having a size of 250 mm (length)×200 mm (width)×50 mm (thickness) and subjected to in-mold molding under conditions described in each of Tables 2 and 3 such that after heating with a water vapor, the molded article was cooled and taken out from the mold. The molded article was further heated for drying and aging within an oven at 60° C. for 12 hours, followed by taking out, thereby obtaining an expanded beads molded article. The physical properties, etc. of the obtained expanded beads molded article are shown in Tables 2 and 3, respectively.

TABLE 2

| | | | | Example 1 | Example 2 | Example 3 | Example 4 |
|---|---|---|---|---|---|---|---|
| Beads properties | Core layer | Ratio | mass % | 95 | 95 | 95 | 95 |
| | | Raw material | Composition | Base Polymer 1 | Base Polymer 2 | Base Polymer 2 | Base Polymer 2 |
| | | Vicat softening temperature | Virgin raw material (° C.) | 80 | 93 | 93 | 93 |
| | | A50 method Tc | Crosslinked raw material (° C.) | 114 | 117 | 117 | 117 |
| | | Melting point Tmc | ° C. | 120 | 125 | 125 | 125 |
| | | Flexural modulus | MPa | 28 | 53 | 53 | 53 |
| | | Coefficient of dynamic friction | | 0.9 | 1.1 | 1.1 | 1.1 |
| | Cover layer | Ratio | mass % | 5 | 5 | 5 | 5 |
| | | Raw material | Composition | Polymer 2 | Polymer 2 | Polymer 3 | Polymer 1 |
| | | Vicat softening temperature | Virgin raw material (° C.) | 115 | 115 | 108 | 128 |
| | | A50 method Ts | Crosslinked raw material (° C.) | 125 | 125 | 113 | 128 |
| | | Melting point Tms | ° C. | 127 | 127 | 113 | 132 |
| | | Flexural modulus | MPa | 660 | 660 | 160 | 870 |
| | | Coefficient of dynamic friction | | 0.2 | 0.2 | 0.6 | 0.2 |

TABLE 2-continued

|  |  |  |  | Example 1 | Example 2 | Example 3 | Example 4 |
|---|---|---|---|---|---|---|---|
|  | Ts − Tc |  | Virgin raw material (° C.) | 35 | 22 | 15 | 35 |
|  |  |  | Crosslinked raw material (° C.) | 11 | 8 | −4 | 11 |
|  | Melting point difference (Tms − Tmc) |  | ° C. | 7 | 2 | −12 | 7 |
|  | Inside diameter of through-hole |  | mm | 1.0 | 1.0 | 1.0 | 1.0 |
| Expansion | Crosslinking conditions | Crosslinking agent | Kind | Tri117 | Tri117 | Tri117 | Tri117 |
|  |  |  | Parts by mass | 1.1 | 1.2 | 1.2 | 1.2 |
|  |  | Impregnation temperature | ° C. | 110 | 110 | 110 | 110 |
|  |  | Impregnation holding time | mm | 30 | 30 | 30 | 30 |
|  |  | Crosslinking temperature | ° C. | 160 | 160 | 160 | 160 |
|  |  | Crosslinking holding time | min | 30 | 30 | 30 | 30 |
|  | Expansion conditions | Expansion temperature | ° C. | 160 | 160 | 160 | 160 |
|  |  | Pressure in kettle | MPa(G) | 4.0 | 4.0 | 4.0 | 4.0 |
|  | Expanded beads | Apparent density | kg/m$^3$ | 82 | 72 | 70 | 88 |
|  |  | Bulk density | kg/m$^3$ | 45 | 40 | 37 | 50 |
|  |  | Apparent density/Bulk density | — | 1.82 | 1.80 | 1.89 | 1.76 |
|  |  | Voidage | % | 12 | 11 | 15 | 9 |
|  |  | Xylene insoluble content | mass % | 53 | 51 | 53 | 50 |
|  |  | Average cell diameter | μm | 100 | 122 | 117 | 118 |
|  |  | Outer layer thickness (Ds) | μm | 3.8 | 5.1 | 6.9 | 5.3 |
|  |  | Inner layer thickness (Dc) | μm | 1.7 | 1.6 | 1.1 | 1.9 |
|  |  | (Ds)/(Dc) | — | 2.2 | 3.2 | 6.3 | 2.8 |
|  |  | Aspect ratio | — | 1.1 | 1.1 | 1.1 | 1.1 |
|  |  | Angle of repose | ° | 42 | 42 | 42 | 43 |
|  |  | Inside diameter of through-hole | mm | 1.1 | 1.1 | 1.4 | 1.1 |
| Second-stage expanded beads |  | Internal pressure | MPa | 0.06 | 0.6 | 0.6 | 0.6 |
|  |  | Steam pressure | MPa(G) | 0.08 | 0.08 | 0.06 | 0.06 |
|  |  | Apparent density | kg/m$^3$ | 37 | 39 | 39 | 27 |
|  |  | Bulk density | kg/m$^3$ | 20 | 21 | 20 | 15 |
|  |  | Apparent density/Bulk density | — | 1.85 | 1.86 | 1.95 | 1.80 |
|  |  | Voidage | % | 14 | 14 | 18 | 11 |
|  |  | Average cell diameter | μm | 110 | 132 | 141 | 129 |
|  |  | Outer layer thickness (Ds) | μm | 2.3 | 2.3 | 2.3 | 2.5 |
|  |  | Inner layer thickness (Dc) | μm | 0.8 | 0.8 | 0.9 | 0.8 |
|  |  | (Ds)/(Dc) | — | 2.9 | 2.9 | 2.6 | 3.1 |
|  |  | Aspect ratio | — | 1.2 | 1.2 | 1.2 | 1.2 |
|  |  | Angle of repose | ° | 43 | 43 | 42 | 43 |
|  |  | Inside diameter of through-hole | mm | 1.8 | 1.8 | 1.7 | 1.5 |
| Molded article |  | Cracking | % | 10 | 10 | 10 | 10 |
|  |  | Molding pressure | MPa(G) | 0.12 | 0.12 | 0.10 | 0.16 |
|  |  | Density | kg/m$^3$ | 36 | 28 | 31 | 26 |
|  |  | Shrinkage rate | % | 14 | 9 | 10 | 10 |
|  |  | Voidage | % | 20 | 21 | 21 | 18 |
|  |  | Coefficient of variation of density (C.V) | — | 0.015 | 0.013 | 0.016 | 0.017 |
|  |  | Compression set | % | 1 | 1 | 1 | 1 |
|  |  | Rate of dimensional change upon heating at 80° C. | % | −2.0 | −1.3 | −1.6 | −1.1 |
|  |  | Tensile strength (A) | MPa | 0.09 | 0.12 | 0.11 | 0.13 |
|  |  | Tensile elongation (B) | % | 86 | 80 | 69 | 87 |
|  |  | (A) × (B) |  | 7.7 | 9.6 | 7.6 | 11.3 |

TABLE 3

|  |  |  |  | Comparative Example 1 | Comparative Example 2 | Comparative Example 3 | Comparative Example 4 |
|---|---|---|---|---|---|---|---|
| Beads properties | Core layer | Ratio | mass % | 100 | 100 | 95 | 95 |
|  |  | Raw material | Composition | Base Polymer 1 | Base Polymer 2 | Base Polymer 2 | Base Polymer 2 |
|  |  | Vicat softening temperature | Virgin raw material (° C.) | 80 | 93 | 93 | 93 |
|  |  | A50 method Tc | Crosslinked raw material (° C.) | 114 | 117 | 117 | 117 |
|  |  | Melting point Tmc | ° C. | 120 | 125 | 125 | 125 |
|  |  | Flexural modulus | MPa | 28 | 53 | 53 | 53 |
|  |  | Coefficient of dynamic friction |  | 0.9 | 1.1 | 1.1 | 1.1 |
|  | Cover layer | Ratio | mass % | 0 | 0 | 5 | 5 |
|  |  | Raw material | Composition | — | — | Base Polymer 1 | Polymer 4 |
|  |  | Vicat softening temperature | Virgin raw material (° C.) | — | — | 80 | 90 |
|  |  | A50 method Ts | Crosslinked raw material (° C.) | — | — | 114 | 100 |
|  |  | Melting point Tms | ° C. | 120 | 125 | 120 | 102 |
|  |  | Flexural modulus | MPa | — | — | 28 | 110 |
|  |  | Coefficient of dynamic friction |  | 0.9 | 1.1 | 0.9 | 0.5 |

TABLE 3-continued

| | | | Comparative Example 1 | Comparative Example 2 | Comparative Example 3 | Comparative Example 4 |
|---|---|---|---|---|---|---|
| | Ts − Tc | Virgin raw material (° C.) | — | — | −13 | −3 |
| | | Crosslinked raw material (° C.) | — | — | −3 | −17 |
| | Melting point difference (Tms − Tmc) | ° C. | 0 | 0 | −5 | −23 |
| | Inside diameter of through-hole | mm | 1.15 | 1.1 | 1.0 | 1.0 |
| Expansion conditions | Crosslinking agent | Kind | Tri117 | Tri117 | Tri117 | Tri117 |
| | | Parts by mass | 1.0 | 1.2 | 1.2 | 1.2 |
| | | Impregnation temperature ° C. | 110 | 110 | 110 | 110 |
| | | Impregnation holding time min | 30 | 30 | 30 | 30 |
| | | Crosslinking temperature ° C. | 160 | 160 | 160 | 160 |
| | | Crosslinking holding time min | 30 | 30 | 30 | 30 |
| | Expansion conditions | Expansion temperature ° C. | 160 | 160 | 160 | 160 |
| | | Pressure in kettle MPa(G) | 4.0 | 4.0 | 4.0 | 4.0 |
| | Expanded beads | Apparent density kg/m$^3$ | 74 | 64 | 68 | 67 |
| | | Bulk density kg/m$^3$ | 35 | 33 | 36 | 34 |
| | | Apparent density/Bulk density | 2.11 | 1.95 | 1.89 | 1.97 |
| | | Voidage % | 24 | 18 | 15 | 19 |
| | | Xylene insoluble content mass % | 48 | 50 | 53 | 51 |
| | | Average cell diameter μm | 112 | 72 | 123 | 90 |
| | | Outer layer thickness (Ds) μm | 1.8 | 1.5 | 4.4 | 3.3 |
| | | Inner layer thickness (Dc) μm | 1.2 | 1.9 | 1.7 | 1.3 |
| | | (Ds)/(Dc) | 1.5 | 0.8 | 2.6 | 2.5 |
| | | Aspect ratio | 1.1 | 1.1 | 1.1 | 1.1 |
| | | Angle of repose ° | 46 | 45 | 46 | 43 |
| | | Inside diameter of through-hole mm | 2.2 | 1.5 | 1.4 | 1.5 |
| Second-stage expanded beads | | Internal pressure MPa | 0.6 | 0.6 | 0.6 | 0.6 |
| | | Steam pressure MPa(G) | 0.04 | 0.08 | 0.08 | 0.04 |
| | | Apparent density kg/m$^3$ | 41 | 39 | 34 | 39 |
| | | Bulk density kg/m$^3$ | 20 | 20 | 18 | 20 |
| | | Apparent density/Bulk density | 2.05 | 1.95 | 1.89 | 1.95 |
| | | Voidage % | 22 | 18 | 15 | 18 |
| | | Average cell diameter μm | 124 | 94 | 135 | 106 |
| | | Outer layer thickness (Ds) μm | 1 | 1.1 | 2.2 | 2.3 |
| | | Inner layer thickness (Dc) μm | 0.9 | 1 | 0.9 | 0.8 |
| | | (Ds)/(Dc) | 1.1 | 1.1 | 2.4 | 2.9 |
| | | Aspect ratio | 1.2 | 1.2 | 1.2 | 1.2 |
| | | Angle of repose ° | 46 | 45 | 46 | 43 |
| | | Inside diameter of through-hole mm | 2.0 | 2.0 | 1.8 | 1.9 |
| Molded article | | Cracking % | 10 / 10 | 10 / 10 | 10 / 10 | 10 / 10 |
| | | Molding pressure MPa(G) | 0.06 / 0.08 | 0.10 / 0.12 | 0.08 / 0.10 | |
| | | Density kg/m$^3$ | 26 / 28 | 30 / 24 | 28 / 30 | |
| | | Shrinkage rate % | 15 / 20 | 9 / 9 | 9 / 10 | |
| | | Voidage % | 20 / 8 | 28 / 24 | 26 / 11 | |
| | | Coefficient of variation of density (C.V) | 0.029 / NT* | 0.027 / 0.034 | 0.015 / 0.010 | |
| | | Compression set % | 1 / NT* | 1 / 1 | 1 / 1.5 | |
| | | Rate of dimensional change upon heating at 80° C. % | −2.5 / NT* | −1.5 / −1.6 | −1.3 / −2.1 | |
| | | Tensile strength (A) MPa | 0.02 / NT* | 0.06 / 0.03 | 0.08 / 0.14 | |
| | | Tensile elongation (B) % | 21 / NT* | 25 / 45 | 55 / 84 | |
| | | (A) × (B) | 0.4 / NT* | 1.5 / 1.4 | 4.4 / 11.8 | |

*NT: The measurement could not be performed because the shrinkage was so vigorous that a favorable molded article was not obtained.

As is noted from Table 2, in accordance with the Examples, even in the molded articles having a low density, the expanded thermoplastic elastomer beads molded articles which are high in the voidage and uniform and have excellent lightness in weight, flexibility, durability, heat resistance, etc. were obtained. Examples 2 to 4 in which Elastomer 2 was used as the raw material constituting the core layer were smaller in the rate of dimensional change upon heating at 80° C. and more excellent in the heat resistance.

As is noted from Table 3, the expanded beads molded articles of Comparative Examples 1 and 2 do not have the cover layer, and therefore, the value of [(A)×(B)] was low, and the durability was inferior. In addition, in Comparative Example 1, in the case of setting the molding pressure to 0.08 MPa(G) in order to improve the durability, a favorable molded article could not be molded.

In Comparative Example 3, since the coefficient of dynamic friction of the thermoplastic elastomer constituting the cover layer was large, the filling properties of the expanded beads were poor, the value of the coefficient of variation of density was large, and the voidage in the expanded beads molded article was varied.

In the expanded beads molded article of Comparative Example 4, in the case of performing molding at a molding pressure of 0.08 MPa(G), the value of [(A)×(B)] was low, and the durability was inferior. In addition, in the case of setting the molding pressure to 0.10 MPa(G) in order to improve the durability, the voidage was lowered. It may be considered that this was caused due to the matter that the melting point of the thermoplastic polymer constituting the cover layer was lower by more than 20° C. than the melting point of the base polymer constituting the core layer, and therefore, the secondary expansion of the core layer could not be suppressed.

With respect to Example 1 and Comparative Example 1, the results when the in-mold molding was performed without performing the second-stage expansion are shown in Table 4. Even in this case, in the expanded beads of the present invention, the expanded beads molded article which is high in the voidage and excellent in the durability, heat resistance, etc. could be molded. On the other hand, in the expanded beads of Comparative Example 1, even in the case of producing the expanded beads molded article having a high apparent density, the filling properties were poor, and the durability was inferior.

INDUSTRIAL APPLICABILITY

The expanded thermoplastic elastomer beads molded article of the present invention is high in voidage and uniform and has excellent lightness in weight, flexibility, durability, heat resistance, etc., and therefore, it is suitable for applications, such as buffer materials, vibration insulating materials, cushioning materials, sporting goods, automobile members, and building materials, and there are expectations for development of further applications thereof, too.

The invention claimed is:

1. Expanded cylindrical thermoplastic elastomer beads provided with through-holes, the expanded thermoplastic elastomer beads comprising a core layer in a foamed state constituted of a base polymer containing a thermoplastic elastomer and a cover layer covering the core layer constituted of a thermoplastic polymer, wherein

TABLE 4

|  |  |  |  | Example 1 | Comparative Example 1 |
|---|---|---|---|---|---|
| Beads properties | Core layer | Ratio | mass % | 95 | 100 |
|  |  | Raw material | Composition | Base Polymer 1 | Base Polymer 1 |
|  |  | Vicat softening temperature | Virgin raw material (° C.) | 80 | 80 |
|  |  | A50 method Tc | Crosslinking raw material (° C.) | 114 | 114 |
|  |  | Melting point Tmc | ° C. | 120 | 120 |
|  |  | Flexural modulus | MPa | 28 | 28 |
|  |  | Coefficient of dynamic friction |  | 0.9 | 0.9 |
|  | Cover layer | Ratio | mass % | 5 | 0 |
|  |  | Raw material | Composition | Polymer 2 | — |
|  |  | Vicat softening temperature | Virgin raw material (° C.) | 115 | — |
|  |  | A50 method Ts | Crosslinking raw material (° C.) | 125 | — |
|  |  | Melting point Tms | ° C. | 127 | 120 |
|  |  | Flexural modulus | MPa | 660 | — |
|  |  | Coefficient of dynamic friction |  | 0.2 | 0.9 |
|  | Ts − Tc |  | Virgin raw material (° C.) | 35 | — |
|  |  |  | Crosslinking raw material (° C.) | 11 | — |
|  | Melting point difference (Tms − Tmc) |  | ° C. | 7 | 0 |
|  | Inside diameter of through-hole |  | mm | 1.0 | 1.15 |
| Expansion | Crosslinking conditions | Crosslinking agent | Kind | Tri117 | Tri117 |
|  |  |  | Parts by mass | 1.1 | 1.0 |
|  |  | Impregnation temperature | ° C. | 110 | 110 |
|  |  | Impregnation holding time | min | 30 | 30 |
|  |  | Crosslinking temperature | ° C. | 160 | 160 |
|  |  | Crosslinking holding time | min | 30 | 30 |
|  | Expansion conditions | Expansion temperature | ° C. | 160 | 160 |
|  |  | Pressure in kettle | MPa(G) | 4.0 | 4.0 |
|  | Expanded beads | Apparent density | kg/m³ | 82 | 74 |
|  |  | Bulk density | kg/m³ | 45 | 35 |
|  |  | Apparent density/ Bulk density | — | 1.82 | 2.11 |
|  |  | Voidage | % | 12 | 24 |
|  |  | Xylene insoluble content | mass % | 53 | 48 |
|  |  | Average cell diameter | μm | 100 | 112 |
|  |  | Outer layer thickness (Ds) | μm | 3.8 | 1.8 |
|  |  | Inner layer thickness (Dc) | μm | 1.7 | 1.2 |
|  |  | (Ds)/(Dc) | — | 2.2 | 1.5 |
|  |  | Aspect ratio | — | 1.1 | 1.1 |
|  |  | Angle of repose | ° | 42 | 46 |
|  |  | Inside diameter of through-hole | mm | 1.1 | 2.2 |
| Molded article |  | Cracking | % | 10 | 10 |
|  |  | Molding pressure | MPa(G) | 0.12 | 0.12 |
|  |  | Density | kg/m³ | 64 | 57 |
|  |  | Shrinkage rate | % | 8 | 10 |
|  |  | Voidage | % | 21 | 14 |
|  |  | Coefficient of variation of density (C.V) | — | 0.009 | 0.016 |
|  |  | Compression set | % | 1.5 | 1.5 |
|  |  | Rate of dimensional change upon heating at 80° C. | % | −1 | −2 |
|  |  | Tensile strength (A) | MPa | 0.14 | 0.08 |
|  |  | Tensile elongation (B) | % | 67 | 63 |
|  |  | (A) × (B) |  | 9.4 | 5.0 | a coefficient of dynamic friction of the thermoplastic polymer that constitutes the cover layer is 0.8 or less, and a difference [(Tms)−(Tmc)] between a melting point (Tmc) of the base polymer that constitutes the core layer and a melting point (Tms) of the thermoplastic polymer that constitutes the cover layer is −20° C. or more and 20° C. or less, a difference [(Ts)−(Tc)] between a Vicat softening temperature (Tc) of the base polymer that constitutes the core layer and a Vicat softening temperature (Ts) of the thermoplastic polymer that constitutes the cover layer is −5° C. or more and 35° C. or less, wherein both Ts and Tc are measured in a non-crosslinked state or a crosslinked state.

2. The expanded thermoplastic elastomer beads according to claim 1, wherein the thermoplastic elastomer is an olefin-based thermoplastic elastomer.

3. The expanded thermoplastic elastomer beads according to claim 2, wherein the olefin-based thermoplastic elastomer is a block copolymer of a polyethylene block and an ethylene/α-olefin copolymer block.

4. The expanded thermoplastic elastomer beads according to claim 1, wherein the base polymer further contains a polyethylene-based resin, and the content of the polyethylene-based resin in the base polymer is 3% by mass or more and 40% by mass or less.

5. The expanded thermoplastic elastomer beads according to claim 1, wherein the thermoplastic polymer is a polyolefin-based resin.

6. The expanded thermoplastic elastomer beads according to claim 5, wherein the polyolefin-based resin is a polyethylene-based resin.

7. The expanded thermoplastic elastomer beads according to claim 1, wherein the difference [(Tms)−(Tmc)] between the melting point (Tmc) of the base polymer and the melting point (Tms) of the thermoplastic polymer is −10° C. or more and 15° C. or less.

8. The expanded thermoplastic elastomer beads according to claim 1, wherein a ratio [(Ds)/(Dc)] of the outer layer thickness (Ds) that is a distance in the thickness direction from the surface of the expanded bead to a cell structure part having a cell structure to the inner layer thickness (Dc) that is a distance in the thickness direction from the inner surface of the expanded bead on the through-hole side to the cell structure part is 2 or more.

9. The expanded thermoplastic elastomer beads according to claim 1, wherein a xylene insoluble content by the hot xylene extraction method is 30% by mass or more and 70% by mass or less.

10. The expanded thermoplastic elastomer beads according to claim 1, wherein an apparent density is 10 kg/m$^3$ or more and 250 kg/m$^3$ or less.

11. An expanded thermoplastic elastomer beads molded article formed by subjecting expanded cylindrical thermoplastic elastomer beads provided with through-holes to in-mold molding, the expanded thermoplastic elastomer beads comprising a core layer in foamed state constituted of a base polymer containing a thermoplastic elastomer and a cover layer covering the core layer constituted of a thermoplastic polymer, wherein a voidage is 15% or more, a density is 10 kg/m$^3$ or more and 200 kg/m$^3$ or less, and the product of a tensile strength (MPa) and a tensile elongation (%) is 5 or more, a difference [(Ts)−(Tc)] between a Vicat softening temperature (Tc) of the base polymer that constitutes the core layer and a Vicat softening temperature (Ts) of the thermoplastic polymer that constitutes the cover layer is −5° C. or more and 35° C. or less, wherein both Ts and Tc are measured in a non-crosslinked state or a crosslinked state.

12. The expanded thermoplastic elastomer beads molded article according to claim 11, wherein a coefficient of variation of density is 0.005 to 0.020.

* * * * *